(12) United States Patent
Lambert et al.

(10) Patent No.: US 8,934,088 B2
(45) Date of Patent: Jan. 13, 2015

(54) SOUND-CREATION INTERFACE

(75) Inventors: John Henry Lambert, Devon (GB);
Mark Justin Rigamonti, Devon (GB);
James Stephen Chapman, Dorset (GB)

(73) Assignee: Eigenlabs Limited, London (GB)

( * ) Notice: Subject to any disclaimer, the term of this patent is extended or adjusted under 35 U.S.C. 154(b) by 643 days.

(21) Appl. No.: 13/055,080

(22) PCT Filed: Jul. 21, 2009

(86) PCT No.: PCT/GB2009/001804
§ 371 (c)(1),
(2), (4) Date: Jul. 21, 2011

(87) PCT Pub. No.: WO2010/010338
PCT Pub. Date: Jan. 28, 2010

(65) Prior Publication Data
US 2011/0273700 A1    Nov. 10, 2011

(30) Foreign Application Priority Data

Jul. 21, 2008   (GB) .................................. 0813343.1

(51) Int. Cl.
*G01P 3/36* (2006.01)
*G10H 1/34* (2006.01)
*G05G 9/047* (2006.01)
*G06F 3/03* (2006.01)
*G06F 3/0338* (2013.01)

(52) U.S. Cl.
CPC ............. *G10H 1/34* (2013.01); *G05G 9/04796* (2013.01); *G06F 3/0304* (2013.01); *G06F 3/0338* (2013.01); *G10H 1/342* (2013.01); *G10H 1/344* (2013.01); *G05G 2009/04759* (2013.01); *G10H 2220/305* (2013.01); *G10H 2220/361* (2013.01)

USPC ................... 356/28; 356/139.01; 356/141.1; 356/152.1

(58) Field of Classification Search
USPC ................... 356/28, 36, 139.01, 141.1, 152.1
See application file for complete search history.

(56) References Cited

U.S. PATENT DOCUMENTS 4,055,103 A  * 10/1977 Machanian ...................... 84/617
4,468,999 A     9/1984 Bonanno
4,673,818 A  *  6/1987 Guerra ...................... 250/559.16

(Continued)

FOREIGN PATENT DOCUMENTS

| EP | 0987677 | 3/2000 |
| EP | 1843243 | 10/2007 |
| WO | 2007059614 | 5/2007 |

*Primary Examiner* — Luke Ratcliffe
*Assistant Examiner* — Samantha K Abraham
(74) *Attorney, Agent, or Firm* — Price Heneveld LLP

(57) ABSTRACT

A sound-creation interface is used to create a sound-creation instrument such as a musical instrument. The musical instrument includes a mechanical-human interface such as a set of keys, strings or breathing pipe for user actuation and control of the system, a mechanical-electrical interface receiving inputs from the mechanical-human interface and for converting those inputs to a machine comprehensible signal and an electrical/processor interface receiving signals from the mechanical electrical interface and converting those signals into a processor comprehensible form. A processor receives processor comprehensible signals from the electrical-processor interface and includes a processor component and a memory component. The system allows simplified interaction between the user using the mechanical interface and the processor providing an improved sound-creation interface.

7 Claims, 28 Drawing Sheets

OVERVIEW

(56) References Cited

U.S. PATENT DOCUMENTS

| | | | |
|---|---|---|---|
| 4,748,323 A | 5/1988 | Holiday | |
| 5,179,504 A * | 1/1993 | Kitahara | 361/679.31 |
| 5,223,658 A | 6/1993 | Suzuki | |
| 5,736,989 A * | 4/1998 | Lhotak | 345/593 |
| 5,804,816 A | 9/1998 | Yamamoto et al. | 250/221 |
| 6,229,081 B1 * | 5/2001 | Ura et al. | 84/462 |
| 6,507,391 B2 * | 1/2003 | Riley et al. | 356/28 |
| 6,575,941 B1 * | 6/2003 | Mumford | 604/192 |
| 6,633,301 B1 * | 10/2003 | Dallas et al. | 345/597 |
| 6,737,962 B2 * | 5/2004 | Mayor | 340/431 |
| 6,859,541 B1 | 2/2005 | Hilton | |
| 7,012,237 B1 * | 3/2006 | Ake | 250/214 A |
| 7,349,082 B2 * | 3/2008 | Onvlee et al. | 356/239.8 |
| 7,460,293 B2 * | 12/2008 | Emery et al. | 359/293 |
| 8,042,961 B2 * | 10/2011 | Massara et al. | 362/86 |
| 8,046,042 B2 * | 10/2011 | Diab et al. | 600/336 |
| 2004/0007116 A1 * | 1/2004 | Marcus | 84/10 |
| 2006/0283312 A1 | 12/2006 | Shibata | |
| 2007/0273864 A1 * | 11/2007 | Cho et al. | 356/28 |
| 2009/0316842 A1 * | 12/2009 | Lu et al. | 375/346 |
| 2011/0155316 A1 * | 6/2011 | Byme et al. | 156/261 |

* cited by examiner

OVERVIEW

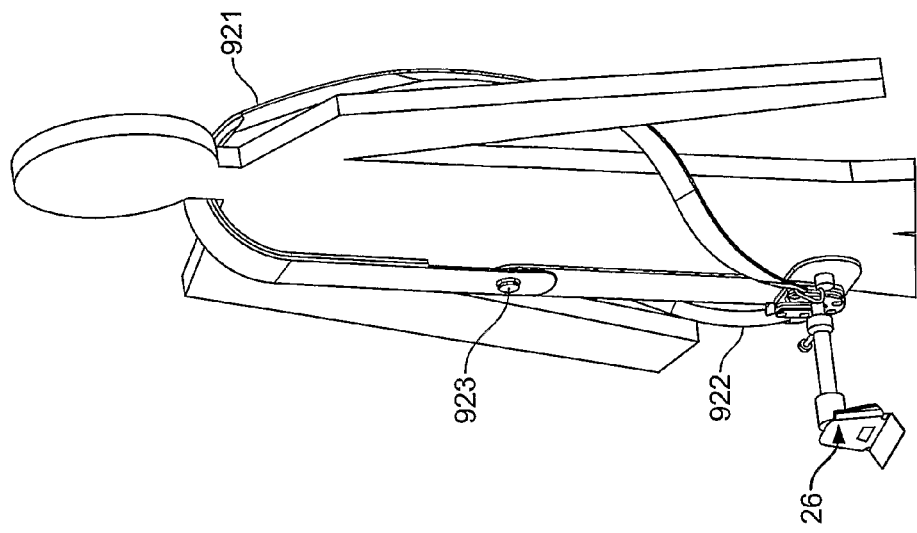
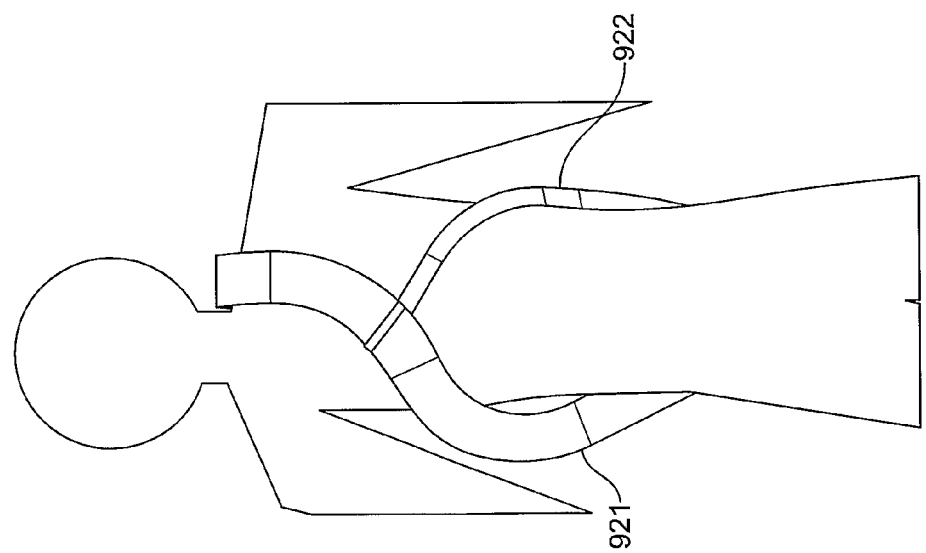
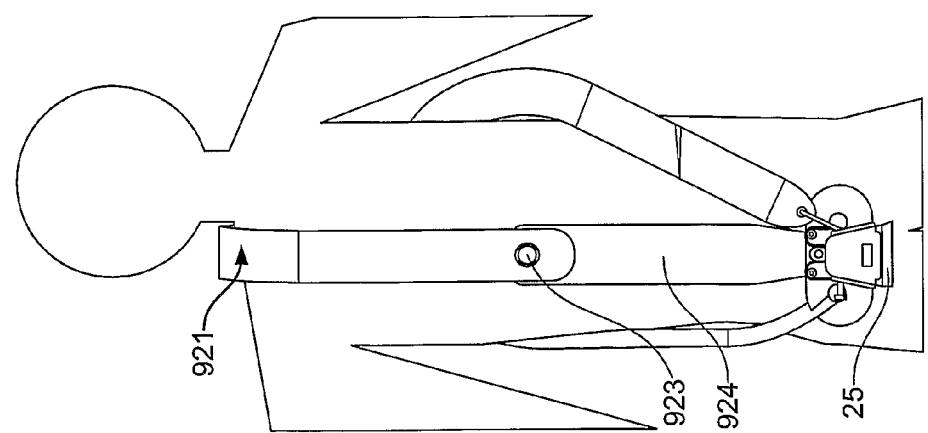

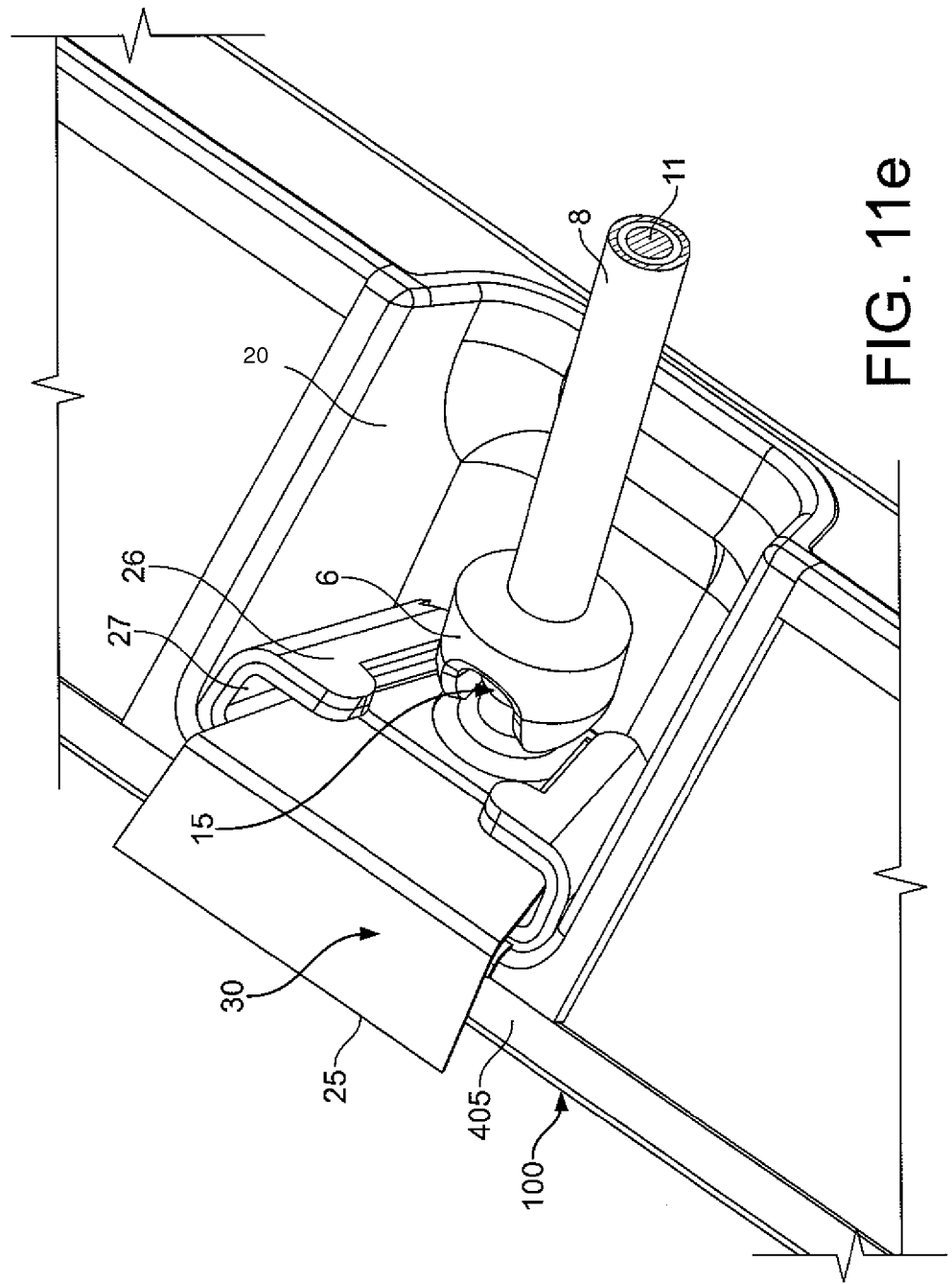

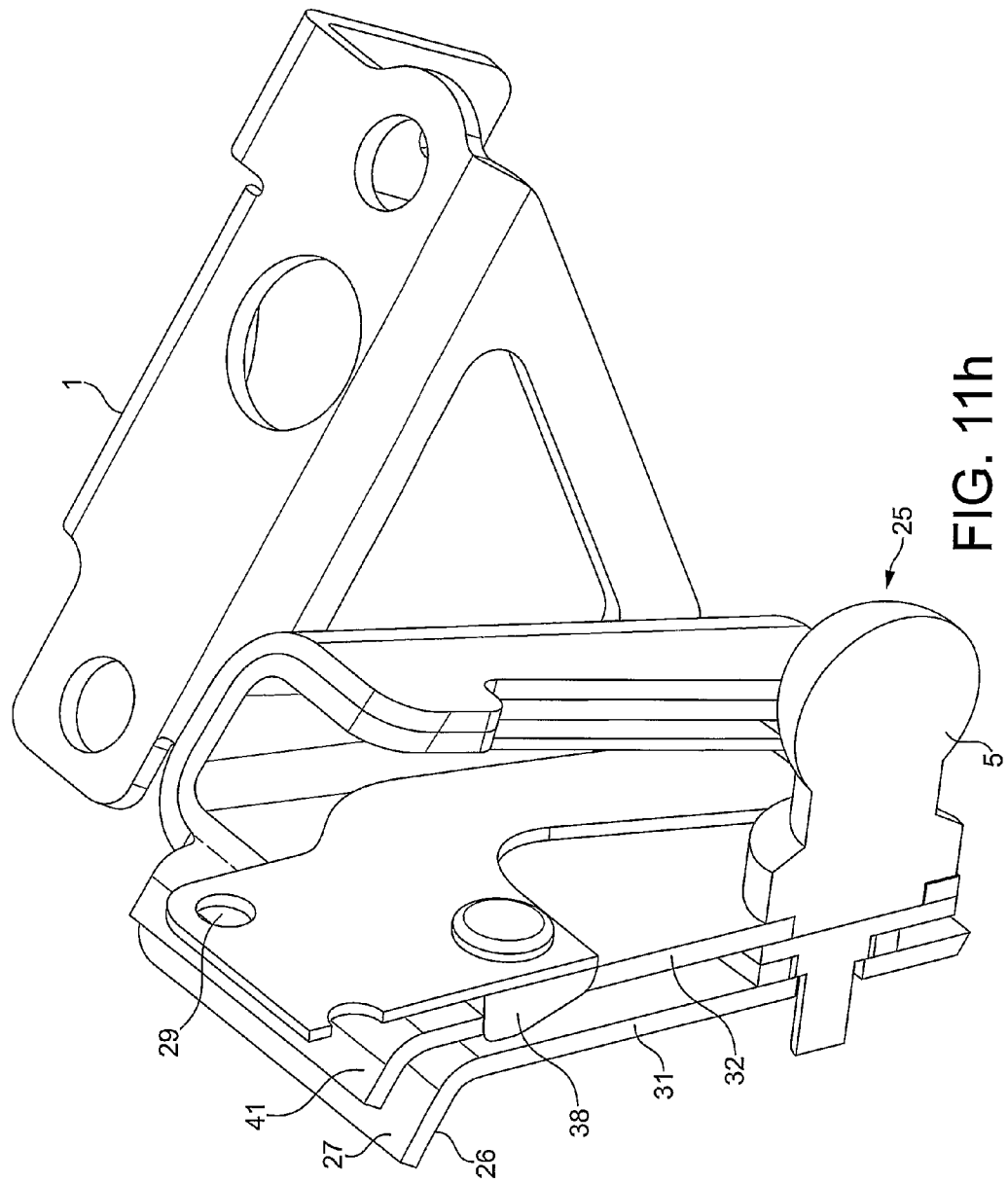

START
432

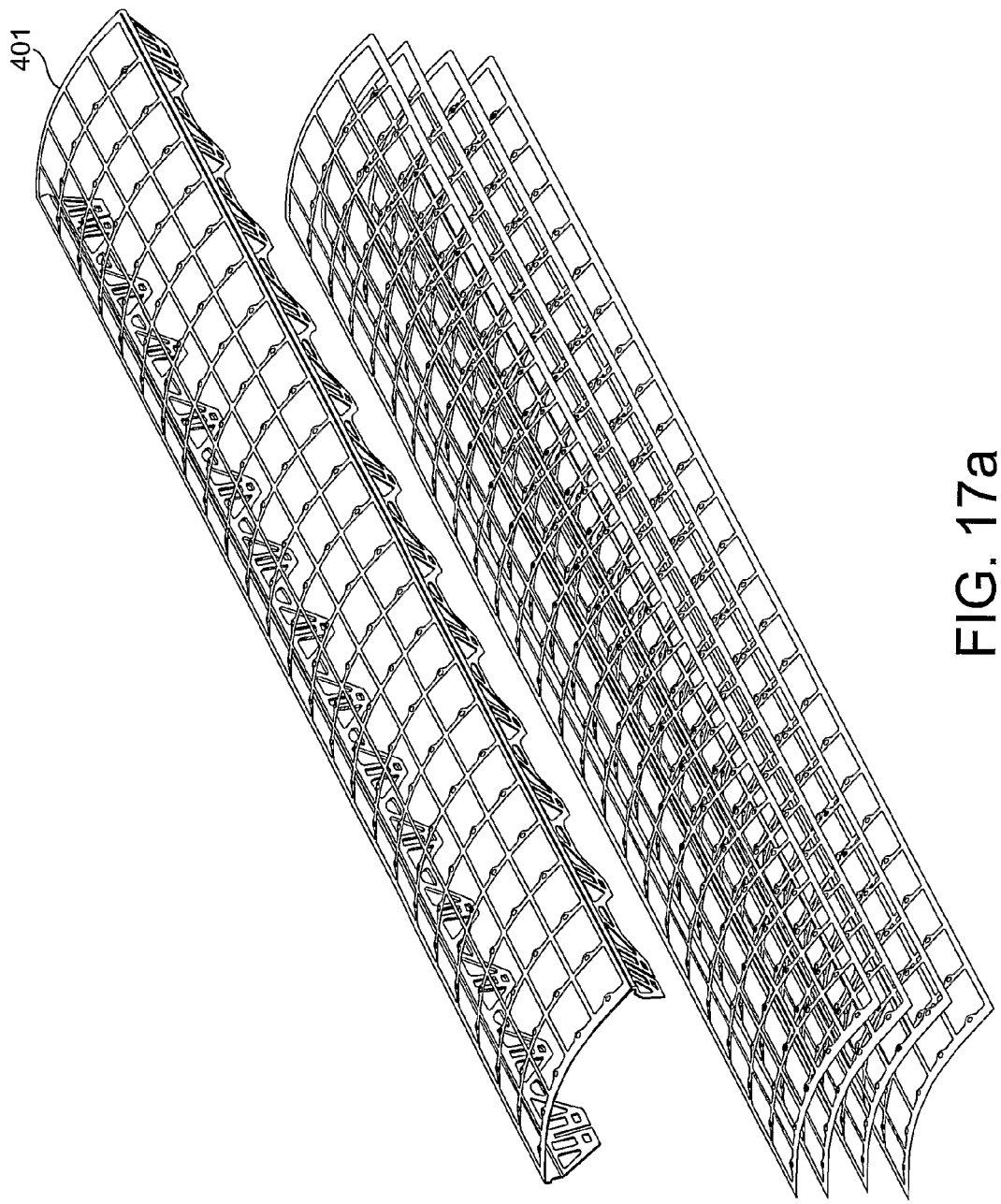

SOUND-CREATION INTERFACE

FIELD OF THE INVENTION

The present invention relates to a method and apparatus for detecting movement of a user element, a sensor, a user input element, a user input, a sound-creation instrument, a sound-creation interface, and also to a user interface, a sound-creation system, and a musical instrument.

BACKGROUND OF THE INVENTION

Musicians have been creating and performing electronic music for many years using computers and synthesizers. A musician inputs his or her instructions into the computer or synthesizer using a computer keyboard and/or a piano-type keyboard having a set of pressable keys. However, whilst a wide range and variety of sounds can be created using a computer or synthesizer, the output is necessarily limited in certain respects as it is difficult to reproduce the complex sound of a saxophone being played or a guitar being strummed using distinct key presses of a keyboard. Furthermore, live performances of electronically generated music have in the past necessarily involved the musicians having to stand behind a computer or a keyboard on stage whilst the musician programs the computer and/or plays the keyboard. This can be dull viewing for the audience in comparison to a live rock band, in which many of the instruments are portable and can be worn and played by a musician moving about the stage.

Some of the issues regarding electronic music creation are addressed at least to some extent with the provision of a sound creation interface that in one embodiment is used to create a sound-creation instrument such as a musical instrument.

STATEMENT OF INVENTION

According to an embodiment, there is provided a method of detecting movement of a user element having a shutter component moveable therewith into a light path between an emitter and a detector comprising receiving, at the detector, light from the emitter, and monitoring for variation in the amount of received light.

According to an embodiment, there is provided a sensor for detecting movement of a user input element, the sensor comprising a light emitter, a light detector and a shutter component arranged to be in operable connection with the user element and to be moveable therewith in response to user actuation of the user input element to at least partially occlude a light path between the light emitter and light detector, whereby a level of light detected at the light detector corresponds to a user actuation of the user input element.

According to an embodiment, there is provided a user input for a sound-creation interface, the user input comprising a housing defining an airflow cavity therethrough, the airflow cavity having an entrance and an exit, a pressure chamber in fluid communication with the airflow cavity, a pressure tube in fluid communication with the pressure chamber and a variable bypass valve arranged at the entrance or exit of the airflow cavity to vary a rate of airflow through the airflow cavity. Spittle and condensation generated during use of the user input are vented through an aperture of the bypass valve.

According to another embodiment, there is provided a sound-creation instrument comprising an attachment device for attaching the musical instrument to a user wearable strap, the attachment device being located at the center of mass of the sound-creation instrument.

According to a further embodiment there is provided a musical instrument comprising a plurality of user actuable inputs for creating musical sounds and having a physical characteristic, the instrument further comprising a control element sharing said physical characteristic and a sensor arranged to sense control element behavior.

According to an embodiment, there is provided a sound creation interface arranged to receive a plurality of distinguishable user inputs and arranged to provide a sound-creation output from a plurality of candidate sound-creation outputs, the interface being programmable via a user input to assign a candidate sound-creation output to any one of the plurality of user inputs. As a result, a user input such as a user actuable key on a sound creation interface such as an electronic musical instrument, can be used to both program the instrument and perform.

According to another embodiment, there is provided a sound creation system including user viewable sound creation agents.

According to a further embodiment there is provided a sound creation system controlled according to program commands actuated by user keys.

BRIEF DESCRIPTION OF THE DRAWINGS

These and other embodiments will be described, by way of example, with reference to the accompanying drawings, in which:

FIG. 5b is a schematic cross section of the prismatic element of FIG. 5a;

FIG. 5d is a plan view of the prismatic element of FIG. 5a;

FIG. 6b is a cross section of the shutter component and spring element of FIG. 6a;

FIG. 6c is a view of the underside of the shutter component and spring element of FIG. 6a;

FIG. 10b is an exploded view of the components of the breath controller of FIG. 10a;

FIG. 11b is a front view of a schematic of a user showing the strap and attachment means of FIG. 11a;

FIG. 11c is a rear view of a schematic of a user showing the strap of FIG. 11a;

FIG. 11d is a perspective view of a schematic of a user wearing the strap and attachment means of FIG. 11a;

FIG. 11e is a schematic representation of the attachment means of FIG. 11a, shown recessed into a base of the sound creation instrument;

FIG. 11f is a section through the attachment means of FIG. 11a;

FIG. 11g is a schematic representation of an instrument attachment device, balljoint mechanism and adjustment screw of the attachment means of FIG. 11a;

FIG. 11h is a perspective detail view of a section through an instrument attachment device and instrument mounting bracket;

FIG. 17a is a perspective view of a portion of an over-frame for the sound-creation instrument;

OVERVIEW

Figure 1:
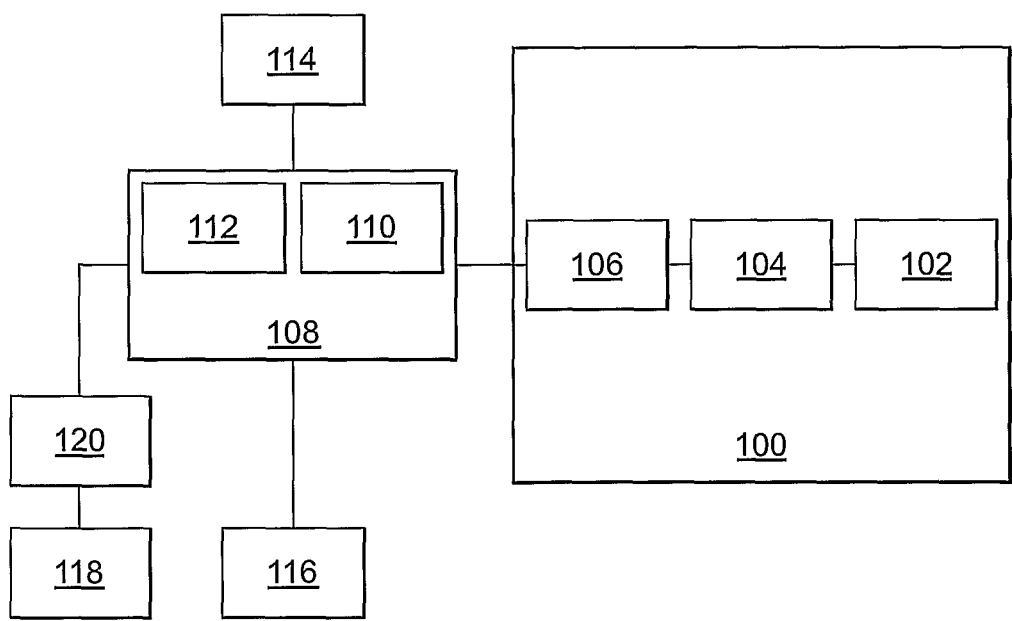
FIG. 1 is an overview of a sound-creation interface.

In overview a sound-creation interface is used to create a sound-creation instrument such as a musical instrument. Referring firstly to FIG. 1, the musical instrument is designated generally 100 and includes a mechanical-human interface 102 such as a set of keys, strings or breathing pipe for user actuation and control of the system, a mechanical-electrical interface 104 receiving inputs from the mechanical-human interface 102 and for converting those inputs to a machine comprehensible signal and an electrical/processor interface receiving signals from the mechanical electrical interface and converting those signals into a processor comprehensible form 106. A processor 108 receives processor comprehensible signals from the electrical-processor interface 106 and includes a processor component 110 and a memory component 112. The system allows simplified interaction between the user using the mechanical interface and the processor providing an improved sound-creation interface.

Figure 2:
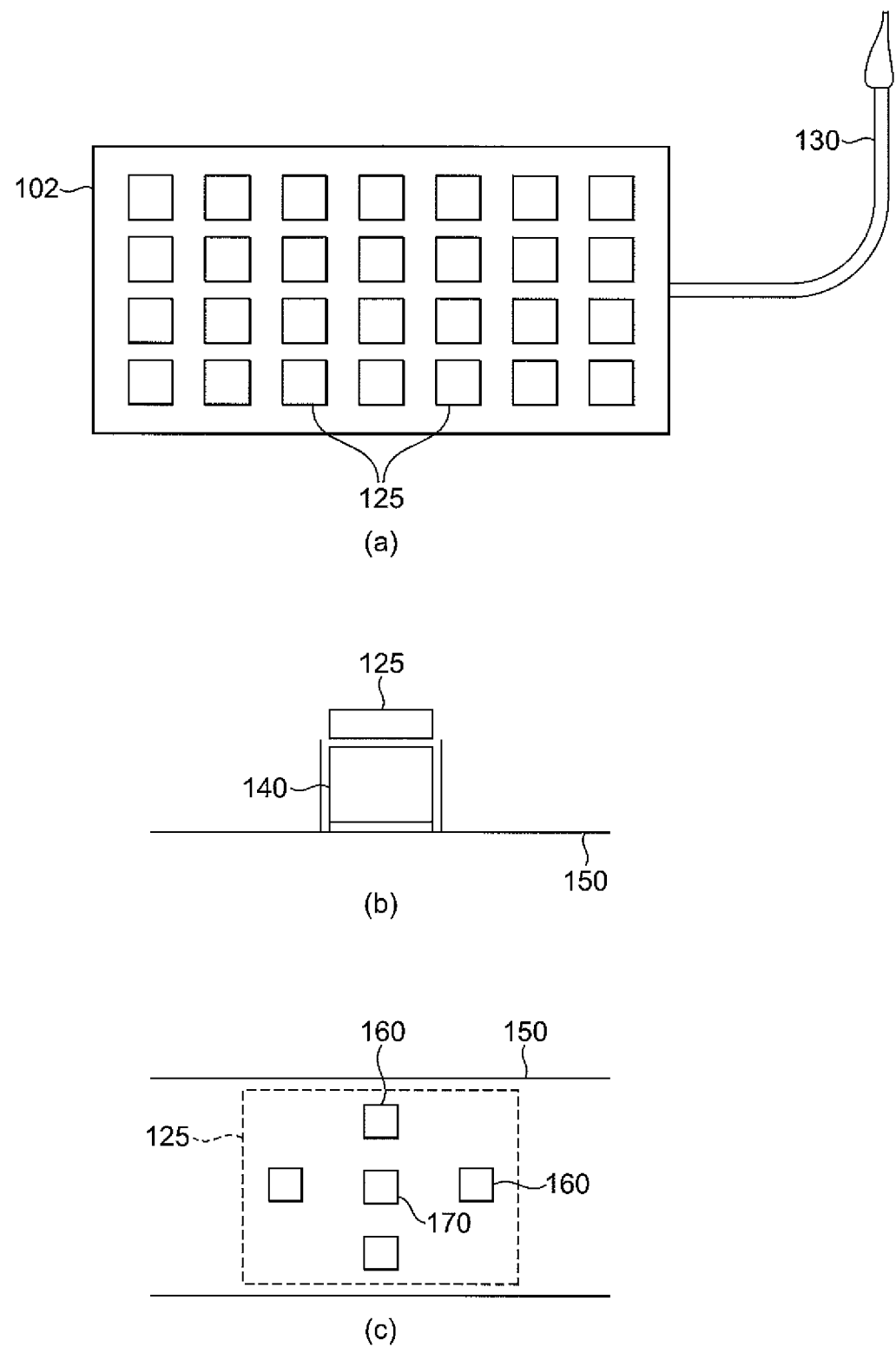
FIGS. 2a, 2b and 2c are an overview of a mechanical-human interface of the sound-creation interface.

Referring now to FIG. 2a, a mechanical-human interface comprises in one embodiment a plurality of user actuatable keys 125 and breath pipe 130. The keys 125 are arranged in an array for ease of user actuation and may for example be set out in an arrangement similar to that of the strings of a guitar, with keys placed at fretpositions of the "strings". The keys may be actuated or played by applying downward pressure in the center of the key or the key may be moved into a roll or yaw position by pressing in a specific direction on an outer part of the key. In this manner, distinguishable user inputs can be played that are converted via the human/mechanical interface and the mechanical/electrical interface into machine comprehensible signals.

The breath pipe 130 is a separate form of user input into which a user may blow, suck or hum in order to produce a measurable static pressure signal that is then processed by a low pass filter at the mechanical-electrical interface to produce an electrical signal corresponding to the positive or negative static pressure exerted by the user blowing, sucking or humming into the breath pipe. The breath pipe can be used by the musician to modulate the pitch of a note played. The humming input can be processed in one of two ways to achieve different outputs. Firstly, the humming can be used as an audio signal to modify other audio signals created e.g., by using the keys or as an audio signal in itself Secondly, the signal can be subjected to a frequency analysis using a Fast Fourier Transform (FFT). The derived signal can then be used to produce user performance data that can be connected wherever the user wishes in the system. The performance data derived from the frequency and amplitude of a user's humming may, for example, be used to control the pitch of an audio oscillator or the frequency and Q (Quality Factor) of an audio filter. A further user input into the sound-creation instrument is a strip controller 132 shown schematically in FIG. 2a. The strip controller 132 essentially comprises a variable resistor that a user may actuate with his/her fingers to produce a glissando effect to a note being played. Such strip controllers are commercially available and as such will not be described in detail here.

In overview, a mechanical-electrical interface 104, shown in FIGS. 2b and 2c, comprises for each key 125 an optical sensor 140 that directly uses the level and direction of user input of the key 125 for conversion via a printed circuit board 150 into an electrical signal. The optical sensor 140 for each key comprises a plurality of light-emitting diodes (LEDs) 160 arranged around a central photo detector 170 on the printed circuit board as seen schematically in FIGS. 2a, 2b and 2c. The optical sensor 140 further comprises a prismatic element 180, seen in FIGS. 3 and 4 that sits over the LEDs and photo detector and is formed to receive light emitted from each of the LEDs to focus it onto the photo detector. The user input element or key 125 sits directly over the optical sensor and has attached to its underside a shutter component 290. The shutter component is supported by a resilient biasing element or spring 200 such that it is able to move in any of three axes of motion according to the specific user actuation of the key 125. The shutter component sits over the prismatic element and as the user plays the key, the shutter component moves downwards towards the prismatic element to at least partially occlude or obstruct a light path between the LEDs and the photo detector. In use of the sound-creation interface, the LEDs are cycled to continually sequentially emit light. A key press or stroke actuates the shutter components to move into the light path of the LEDs to the prismatic element and blocks out light at least to some extent from one or more of the LEDs. The level of light reaching the photo detector from each of the LEDs is converted into a voltage value that corresponds to the key actuation.

In overview, when the LEDs for a single detector cycle their light emission, it is then simply necessary to synchronize detection at the detector with each of the LEDs to obtain the corresponding light value. As discussed in more detail below where there are multiple detectors each with respective multiple LEDs then detection additionally cycled between the multiple detectors and in particular a detection value is sampled during a "detection-on" phase. By overlapping the "detection-on" phase by temporally adjacent detectors in the cycle increased cycling frequency can be obtained. By driving the signal value at the detector to zero after sampling during the detection-on phase the value is reset or "crowbarred" again allowing fast sampling and optimal filtering without the reading of the light level from one LED affecting the reading of the next LED. Yet further movement of the shutter component associated with the user elements such as a key is simply detected by monitoring for variation of the amount of received light and the degree of movement can be assessed either of a single or multiple shutters associated with the key.

The interaction between the keys 125 with a processor, via the instrument electronics, allows a sound-creation interface to be created where distinguishable user inputs such as different pressures on the keys or different roll and yaw values allow control of the creation of music and programming of the system. For example the processor can store multiple candidate sound-creation outputs such as different note pitch, length or synthesizer values and assign the output to any desired key or combination of keys meaning that complete flexibility in music creation is provided. Yet further the user keys can in themselves be used to program the interface as well as subsequently to perform the music according to their assigned values.

Importantly the system can be configured and controlled using a natural language interface where words can be composed into human comprehensible phrases or sentences. Furthermore, as described in more detail below, the language can be communicated as note sequences encoding the words in a musical scale.

As a further aspect of the flexibility of the system, a display 114 is provided allowing the display of programmable sound creation components, or musical components termed "words", governing pitch, tone, scale, effects or synthesizer values as well as other user interfaces or instruments, aspects of performance and so forth in the form of manipulable blocks. These blocks can be manipulated by user selection for example, once again, using the interface to select and combine various blocks to create phrases providing program commands for the instrument. Yet further, the components can be stored in memory 112 (shown in FIG. 1) and operated under the instructions of the processor 110 allowing a modular and flexible controlled approached.

Various functions performed by the system can be performed by agents, aspects of the system can be stored in a data storage structure such as a tree structure including root, and node (branch and leaf) elements where check or hash values are assigned to each node as a function of the data stored in the structure representing the state of the agent. For example when information relating to one of the agents is stored in such a tree structure then the check values will be related to the current state component information. If the information is updated—for example if changed under control of the user then corresponding changes to the data structure can be quickly identified by identifying any changed check values determining which subtrees of any particular node have changed and traversing the tree to establish what check values have been changed. In addition to display of an interface allowing consolation of words to make commands, the data storage structure itself can be represented graphically and as a result rapid update and identification of changes to the system can be identified. Because of the manner which data is stored, the state of the system as a whole can be reviewed and understood in its entirety both by any agent including an implementation or language agent, and by visual display of the data structure in a "birds eye" view.

Referring to FIG. 1, it will further be seen that multiple musical instruments 116, 118 can be used in conjunction with the system allowing ensemble performance and can interact directly with the processor 108 or can interact via additional/processors/interface modules 120.

Description Of Embodiments
Key Arrangement

Figure 3:
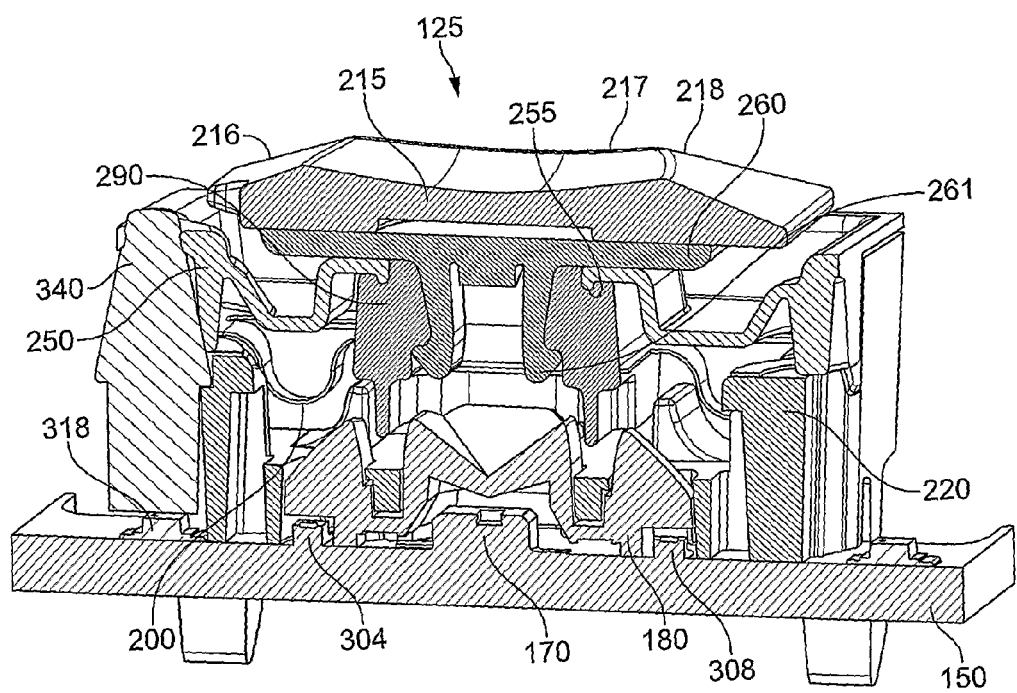
FIG. 3 is a schematic cross section of an embodiment of a key assembly.
Figure 4:
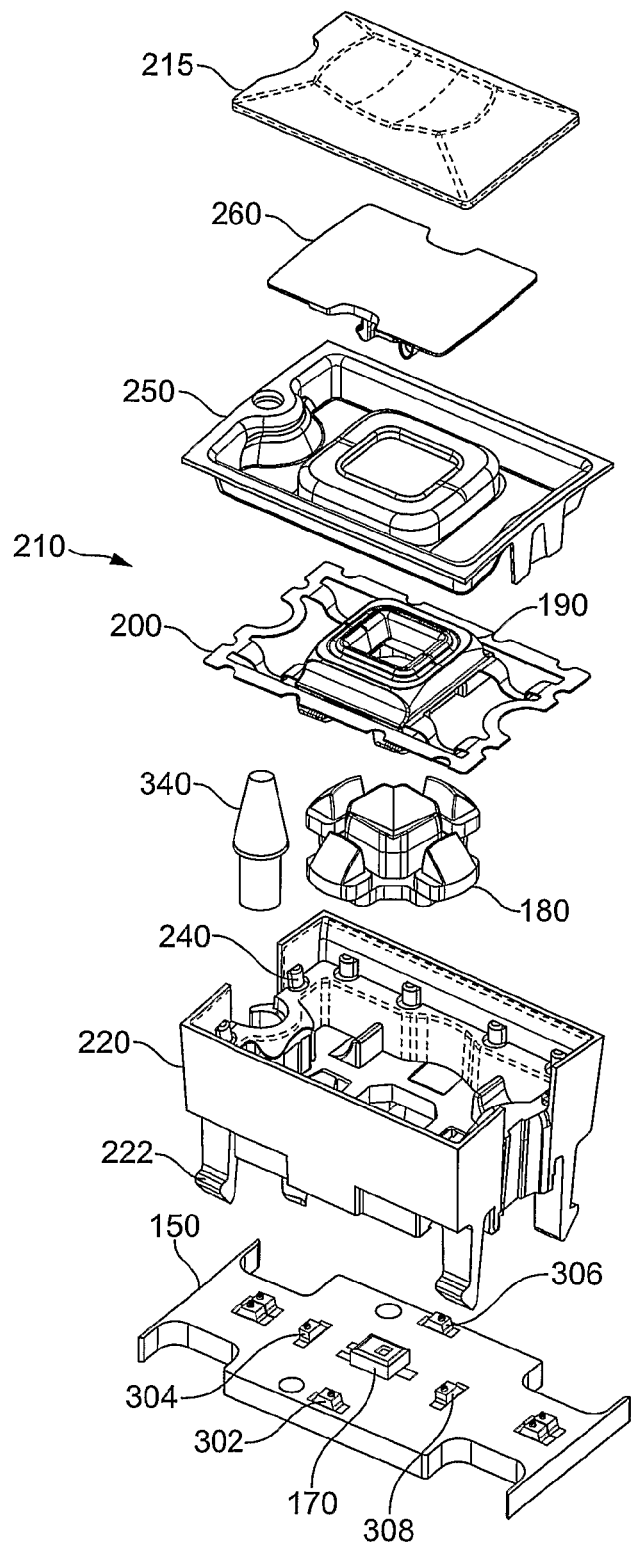
FIG. 4 is an exploded view of the key assembly of FIG. 3.

FIG. 3 shows a sectional view of a user input or key assembly 125 including an optical sensor 140 and a printed circuit board 150 that forms the basis of the mechanical-human and mechanical-electrical interface of the musical instrument 100. FIG. 4 is an exploded view of the same components. The key assembly also includes a key top 215 that provides a user actuatable element and a housing 220 that is located on the printed circuit board 150. The printed circuit board provides electrical routing to the components of the optical sensor 140 that are fitted thereto, as will be described below.

The housing 220 has a generally rectangular exterior shape and it provides rigid mechanical support for the components of the key assembly. The housing 220 is molded to provide an interior surface with shelves, recesses and lugs as necessary on which the components of the key assembly can be positively located. The housing 220 is affixed to the PCB 150 via clips 222 and shown in FIG. 4 or by glue or other appropriate means. In an embodiment, the clips 222 may be replaced by alignment pegs (not shown) or the housing may rest on top of the PCB.

The PCB 150 has fitted thereon a photo detector 170 and four Light Emitting Diodes (LEDs) 302, 304, 306, 308 that are uniformly spaced in a cruciform shape around the photo detector 170. A further feedback LED 318 is fitted on the PCB 150 for providing a visual indicator of the key status to a user. In an embodiment, two or three or several differently colored LEDs are fitted adjacent one another and are used to allow differently coloured signals to be generated to denote different levels or aspects of the key status. One or more bi-colored or tri-colored LED packages could be used to achieve the same effect. The optical sensor 140 consists of the LEDs 302-308, the photo detector 170, a prismatic sensor light guide 180 and a shutter component 290. The LEDs provide a light source for the optical sensor system. The prismatic sensor light guide, hereinafter referred to as a "light guide" is located immediately above the LEDs and photo detector as shown in FIG. 3 and provides a light path between the LEDs and the photo detector.

The photo detector 170 collects light emitted from all four LED, once the light has been focused through the light guide.

Figure 5A:
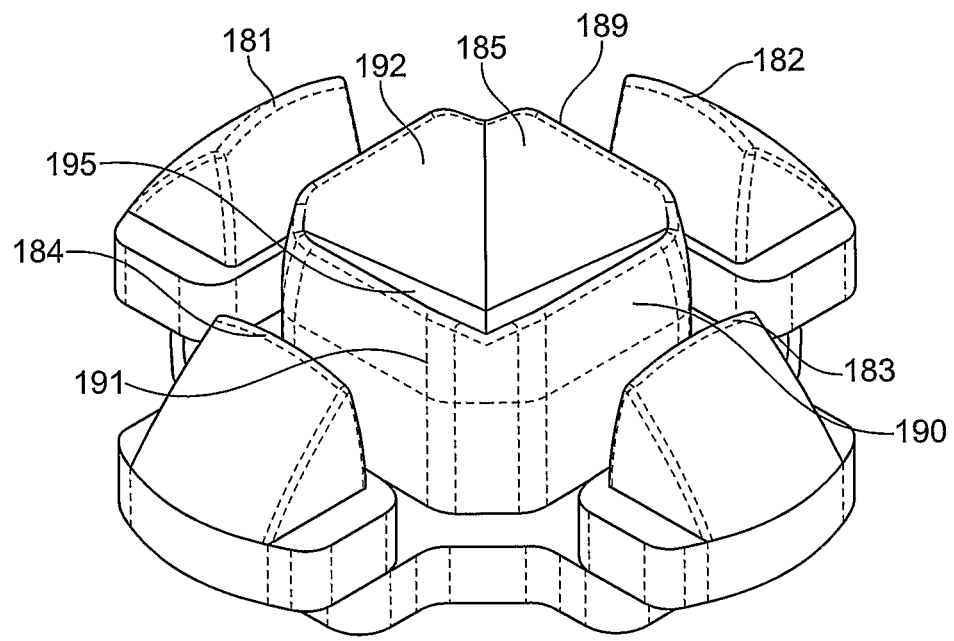
FIG. 5a is a perspective view of an embodiment of a prismatic element of an optical sensor.
Figure 5B:
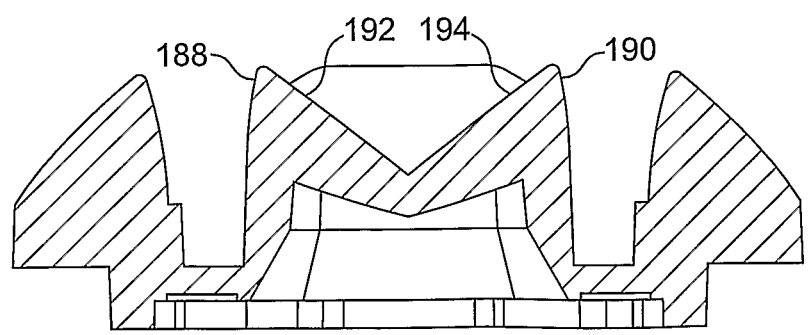
Figure 5C:
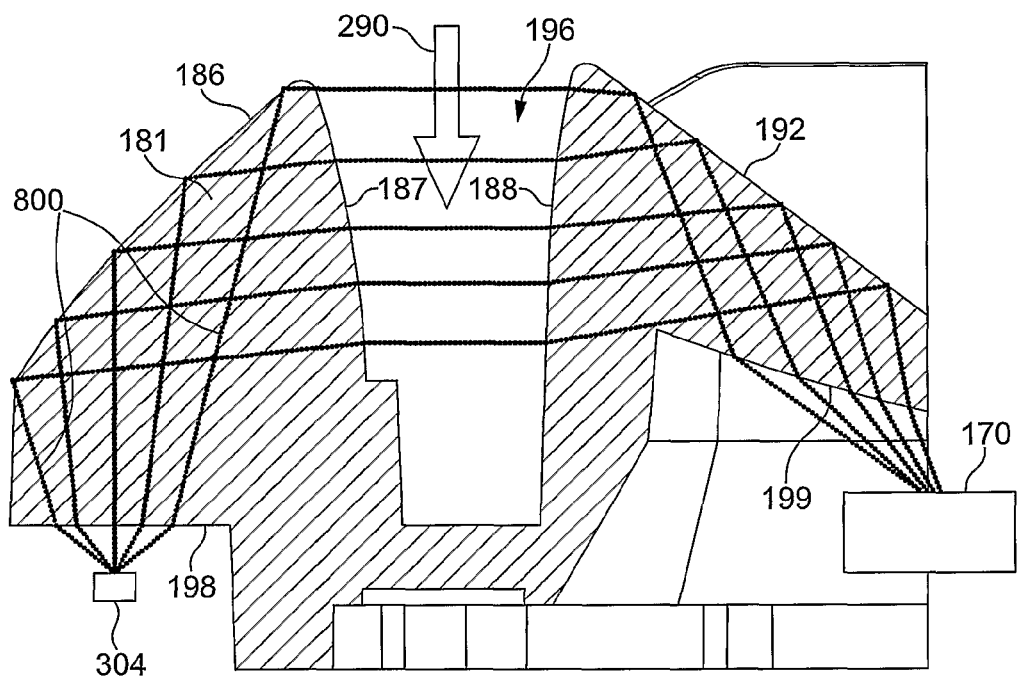
FIG. 5c is a zoomed in view of the cross section of FIG. 5b, showing an example of a light path from an LED to a photodetector.
Figure 5D:
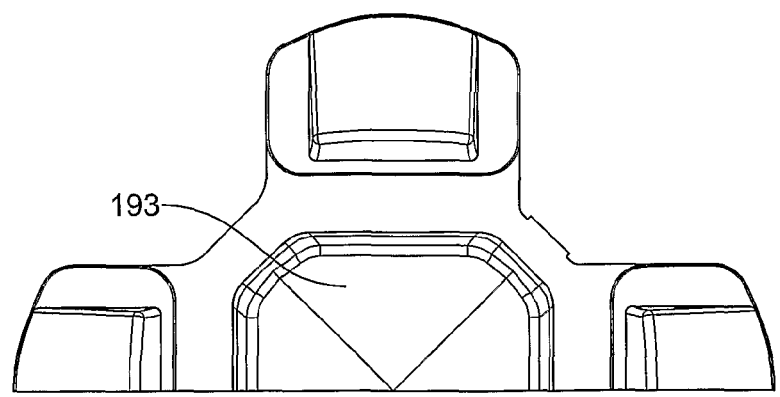

As best seen in FIG. 5a, the light guide 180 comprises four outer prisms 181, 182, 183, 184 arranged around a central prism 185. The light guide is manufactured from clear Lexan™ having a refractive index of 1.59 or higher. The outer prisms 181-184 are each generally scalene triangular shape in cross section as seen in FIG. 5c and comprise an outer sloped, slightly arcuate surface 186 that is arcuate in the vertical plane as shown in FIGS. 5b and 5c. An inner surface 187 of the outer prism 181 is also arcuate in the vertical and horizontal planes.

The central prism 185 comprises a generally quadrilateral shaped element having outer walls 188-191 and is situated centrally amongst the outer prisms 181-184 such that a gap is formed between each of the four outer walls 188, 189, 190, 191 of the central prism and the four inner walls 187 of the outer prism. The walls 188-191 are slightly arcuate in the vertical planes in order to help direct the light beam entering the central prism onto an interior of the central prism. The interior of the central prism comprises four generally triangular shaped walls 192, 193, 194, 195 angled downwardly towards the center of the prism. These walls are very slightly curved in the vertical and horizontal planes.

As best seen in FIG. 5a and FIG. 5c the outer prisms 181-184 and central prism 185 formed a pathway through which light emitted from one of the LEDs 302-308 is directed and focused. By way of illustration, FIG. 5c shows a cross section of outer prism 181 and a portion of central prism 185. An air gap 196 is formed therebetween. Light rays emitted from LED 304 are columnated on entering the outer prism 181 through a lower wall 198 thereof. The light rays are refracted as they entered outer prism 181 towards arcuate outer surface 186. Upon hitting the outer surface 186 the light rays are reflected internally towards the inner surface 187 of the outer prism 181. The light rays exit the prism 181 at surface 187 and pass through the gap 196 and re-entered the prism 185 at surface 188. The curvature of the surfaces of the central prism 185 and the outer prism 181 are such that the light rays are maintained as parallel as possible as they exit the outer prism 181 and enter the central prism 185. The light is then refracted upwards towards the interior wall 192 of the prism 185 where the light reflects from the wall 192 internally towards a lower wall 199 of the central prism. Upon exiting the prism, refraction of the light focuses it onto the photo detector 170. It will be noted that the specific dimensions and curvature of the surfaces in the prism elements have been designed to contain and direct the light emitted from the LEDs and also to provide a "lightgate" in the air gap 196 through which the light beams may pass it is considered that the specific curvature and dimensions of the prism element are within the remit of the skilled person to design and will depend upon the dimensions of the key assembly 125 in general.

The key assembly 210 further includes a shutter component 290 that is supported by a spring element 200 that rests in the housing 220. The spring element 200, seen in FIGS. 6a-6d, comprises a generally rectangular frame 230 that is manufactured from a cold rolled stainless steel sheet, the frame 230 including notches 235 cut into the outer edge thereof for mateably receiving corresponding lugs 240 in the interior of the housing 220 for location of the spring element 200 in the housing. The spring element 200 further comprises a pair of arms 245, 246 that extend inwardly from each of the shorter sides 232a, 232b of the frame 230. The arms 245, 246 are profiled in a U-shape in a direction towards the PCB 150 once the spring is assembled into the key assembly. The arms 245, 246 are terminated by a bridging member 247 upon which the shutter component 290 is affixed, such that the shutter component is resiliently suspended and supported on the arms so that it can be pressed down or lowered/tilted or rolled without folding the outer frame 230 and has freedom of movement in three axes X, Y and Z shown in FIG. 6a.

Figure 6A:
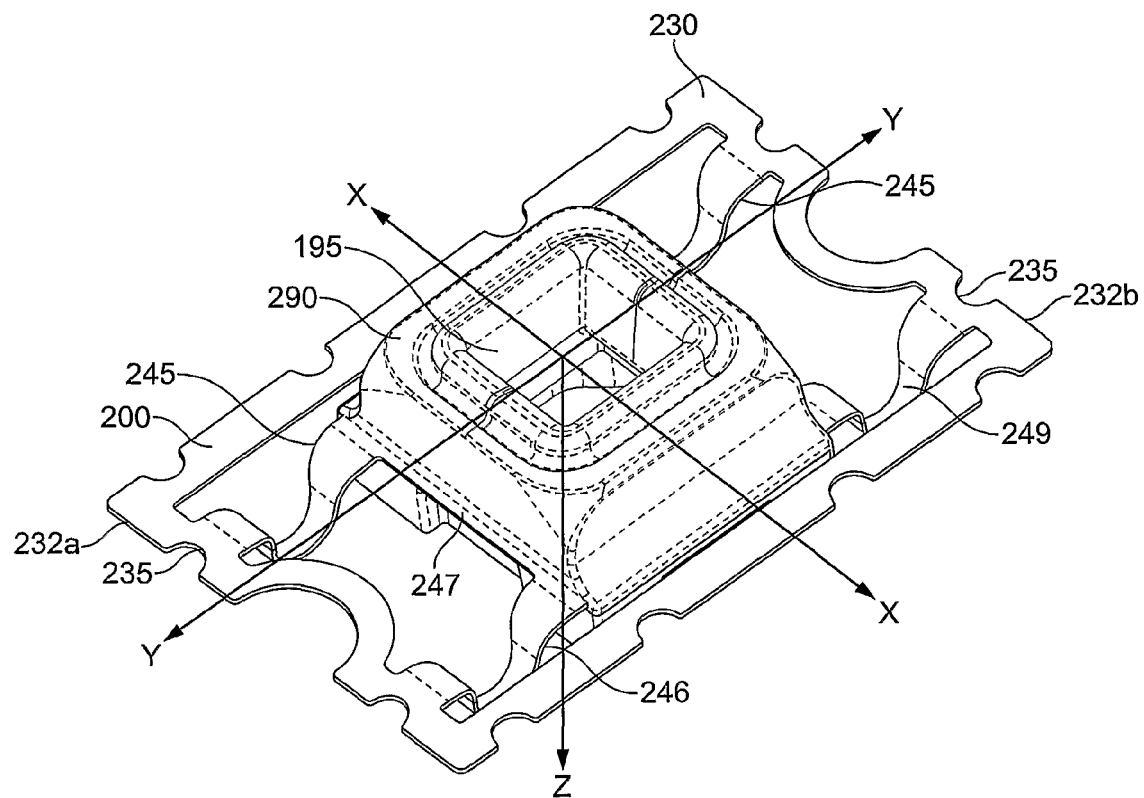
FIG. 6a is a perspective view of an embodiment of a shutter component and a spring element.
Figure 6B:
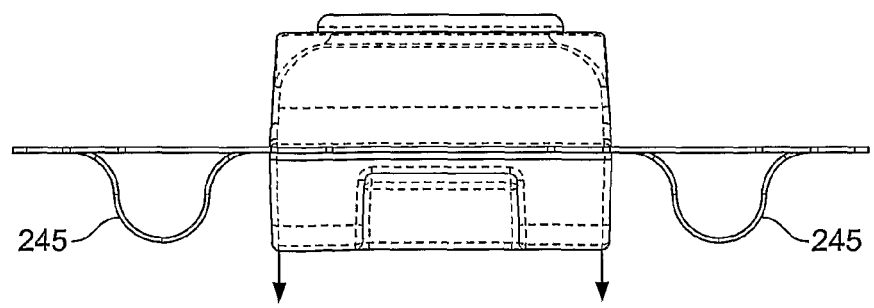
Figure 6C:
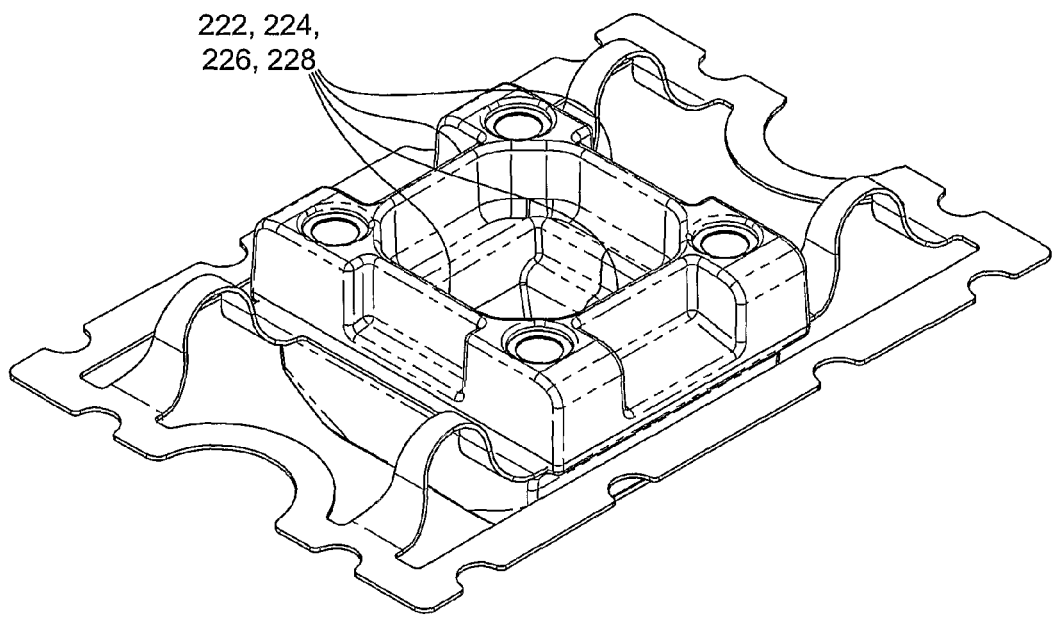

The shutter component 290, best seen in FIGS. 6a, 6b and 6c comprises a rigid glass reinforced nylon component that is molded over the bridging member 247 of the support members. The shutter component 290 is a four sided component having an upper part that supports the key top 215 and transmits force from the key top 215 to the spring 200 and which furthermore supports a key seal 250 in position on the key assembly 125, and a lower part is molded beneath the spring 200 and which includes four side walls or shutter blades 222, 224, 226, 228. Once the key is assembled, the spring 200 rests in the lugs 240 of the housing 220 such that the shutter blades 222-228 are supported at a certain height above each gap 196 formed between the outer prisms 181-184 and the central prism 185 of the prismatic element lightguide 180.

The arms 245, 246 of the spring 200 include a U-bend profile as seen in FIGS. 6a and 6b, the U-bend extending in a direction away from the key top 215. The U-bend profile ensures that whatever possible direction force is applied to the key top 215, it always results in all four shutter blades 222-228 moving downwards towards the prismatic element. Should any key actuation result in one side of the shutter moving downwards and the other side moving upwards, a null key press will result.

Figure 6D:
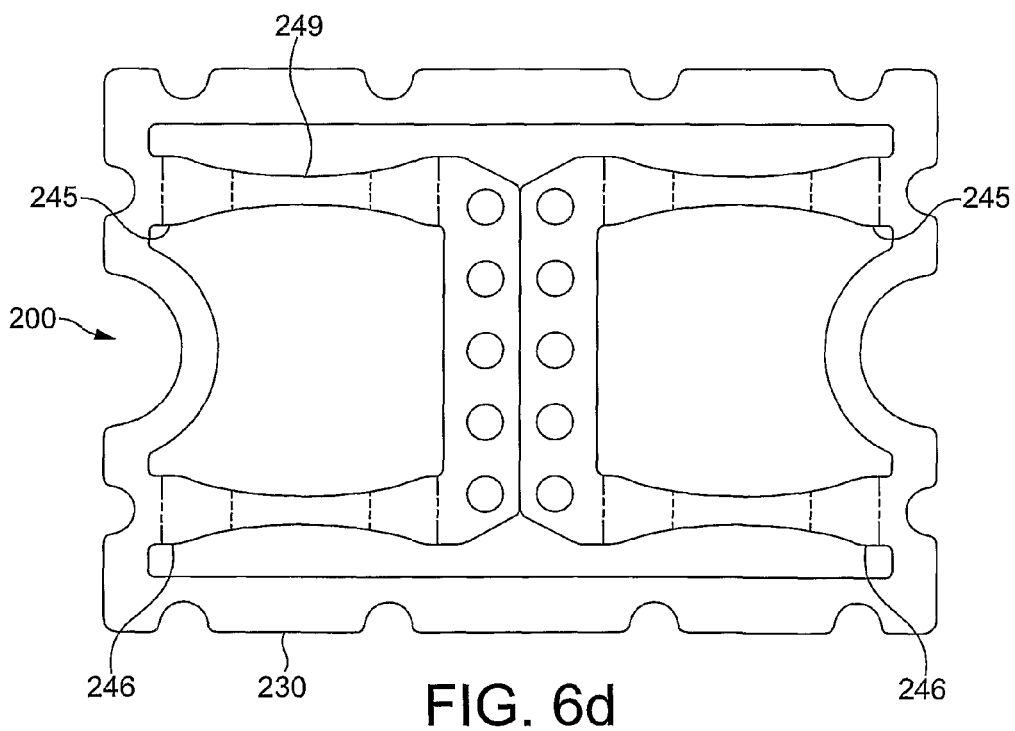
FIG. 6d is a view of the flattened profile of the spring element of FIG. 6a prior to the spring being formed into shape.

The U-bend profile includes a necked portion 249 best seen in the view of the flattened profile of the spring 200 in FIG. 6d and in FIG. 6a, such that the arm 245, 246 is narrower at the lowest point of the bend than it is at the level of the frame 230. The necking of the U-bend profile has several advantages as follows. Firstly, it helps to evenly distribute the stresses on the spring 200 created where the U-bend is flexed during the key actuation. It also maximises the overall downward travel of the key before the yield point of the spring material is reached. The necking 249 also helps to maximize the number of key press cycles that the key 125 can endure before fatigue cracking of the spring element 200 occurs. Fatigue of the spring 200 is furthermore avoided by the use of corner radii at the junction of each arm 245, 246 and the frame 230 to reduce the stress concentration in these areas.

Referring again now to FIGS. 3 and 4, the key assembly 125 further includes a rubber seal 250 comprising a generally rectangular molded rubber component that rests on top of the shutter component 290 in the housing 220. The rubber seal 250 includes a central aperture defining a quadrilateral flange having an elongate bead 255 at a perimeter thereof that fits closely over a corresponding trench contoured into the upper part of the shutter component, preventing the ingress of light, liquid, dust and debris in the key assembly. A perimeter of the rubber seal is shaped to fit closely into the housing 220 to seal the outer part of the key assembly. The seal 250 is manufactured from carbon loaded silicon rubber that also provides an EMC (Electro-magnetic compatability) shield to help to protect the electronic circuitry in the PCB from noise. The rubber seal 250 also provides mechanical damping of the key movement to reduce unwanted resonance. For example, as seen in FIG. 3, the cross section of the rubber seal 250 includes a u-shaped portion at either side of a key sub 260, described below. The u-section has been included to increase the mass of rubber in the key over that which may be present in e.g. a flat seal surface. The increased mass on its own would improve the resonant characteristics of the key, but in addition, the increased length of rubber reduces the spring rate of the seal. Furthermore, the loaded silicon content of the rubber increases the material density, improving the damping characteristic of the rubber and of the key. The damping characteristics may be further increased by introducing a small air hole into the housing wall. For this to work as a means of pneumatic damping, the rubber seal 250 must seal effectively against the key housing.

The key top 215 is located at the uppermost part of the key assembly 125, and is mounted on a key sub 260 that locates the key top 215 onto the shutter component such that movement of the key top 215 results directly in corresponding movement of the shutter component 290. The key top 215 is generally rectangular in plan view and comprises a plastic component with a contoured upper surface designed to maximize the sensitivity of the key to playing gestures. The upper surface is thus shaped as a shallow frusto conical shape, with a center portion that is slightly dished downwards to produce five definite sub-surfaces of the key top for user actuation. In an embodiment, the key is manufactured from wood. The sectional view of the key assembly seen in FIG. 3 shows three of the surfaces 216, 217 and 218. For example, a user press of one of the side surfaces will result in a roll or movement of the key top. These side surfaces may also be used to apply lighter sideways pressure such as a vibrato movement.

The key sub 260 is affixed to an underside of the key top 215 by glue or other appropriate fixing means. It may alternatively be made integral with the key top 215. The key sub 260 includes a spring clip at an underside thereof that is designed to clip into an aperture 195 in the upper portion of the shutter component 290 to rigidly fix the two components together. Clipping the key sub 260 to the shutter component 290 also acts to clamp the rubber seal 250 in place between the shutter component and the key top 215. The underside of the long edges of the keysub 260 are feathered to facilitate the insertion of one or more blades of a keytop removal tool (not shown) between the underside of the keysub 260 and the topside of the shutter component 290 to allow non-destructive removal and changing of the keytops 215 for reasons of wear and/or style.

As shown in FIG. 3, a feedback light guide 340 comprises a clear Lexan™ generally cylindrical member having an upper frusto conical portion. The light guide fits over the feedback LED 318 and extends upwards towards the key top 215 such that once the key is assembled, a user sees only the very top portion of the lightguide. The feedback lightguide 340 transmits light from the feedback LED 318 through to the top of the key 125 to provide visual feedback of the key status to a user. For example, the feedback LED 318 may be configured to emit light only during key actuation. Where two or more feedback LEDs 318 are provided, each LED may be configured to emit light to give feedback to the user of the keyboard configuration when settings are changed. Another example of use of the LEDs is to present to a player a number of different options in the natural language interface. In an embodiment, the feedback lightguide 340 has a roughened top surface that is designed to mix and diffuse the light output from the LED where a bi-colored or tri-colored feedback LED is used, so as to allow the display of all colors present in the spectrum.

In use of the key assembly, a user presses or otherwise actuates, e.g. rolls, yaws etc the key top 215 to cause movement of the key top 215. The movement is directly transmitted through the key sub 260 to the shutter component 290. The four shutter blades 222-228 of the shutter component each move downwards accordingly to occlude light to the four light gates gap 196 as the key is played. Meanwhile, the LEDs 302-308 are cycled sequentially to emit light as will be described further below. The light passes through the outer prism of the prismatic element and is occluded at least to some extent by the shutter blades moving into the light gates. The level of light that reaches the photo detector 170 is thus representative of not only the end event of a key press, but also the level and direction of the key press/play and is converted at the PCB into an electronic signal that can be sent to the processor 108.

As the key is released, the shutter component 290 springs back away from the light gate such that no key-actuation event is detected by the optical sensor 140 until the next time the key is played.

Detection of Key Movement

Figure 7:
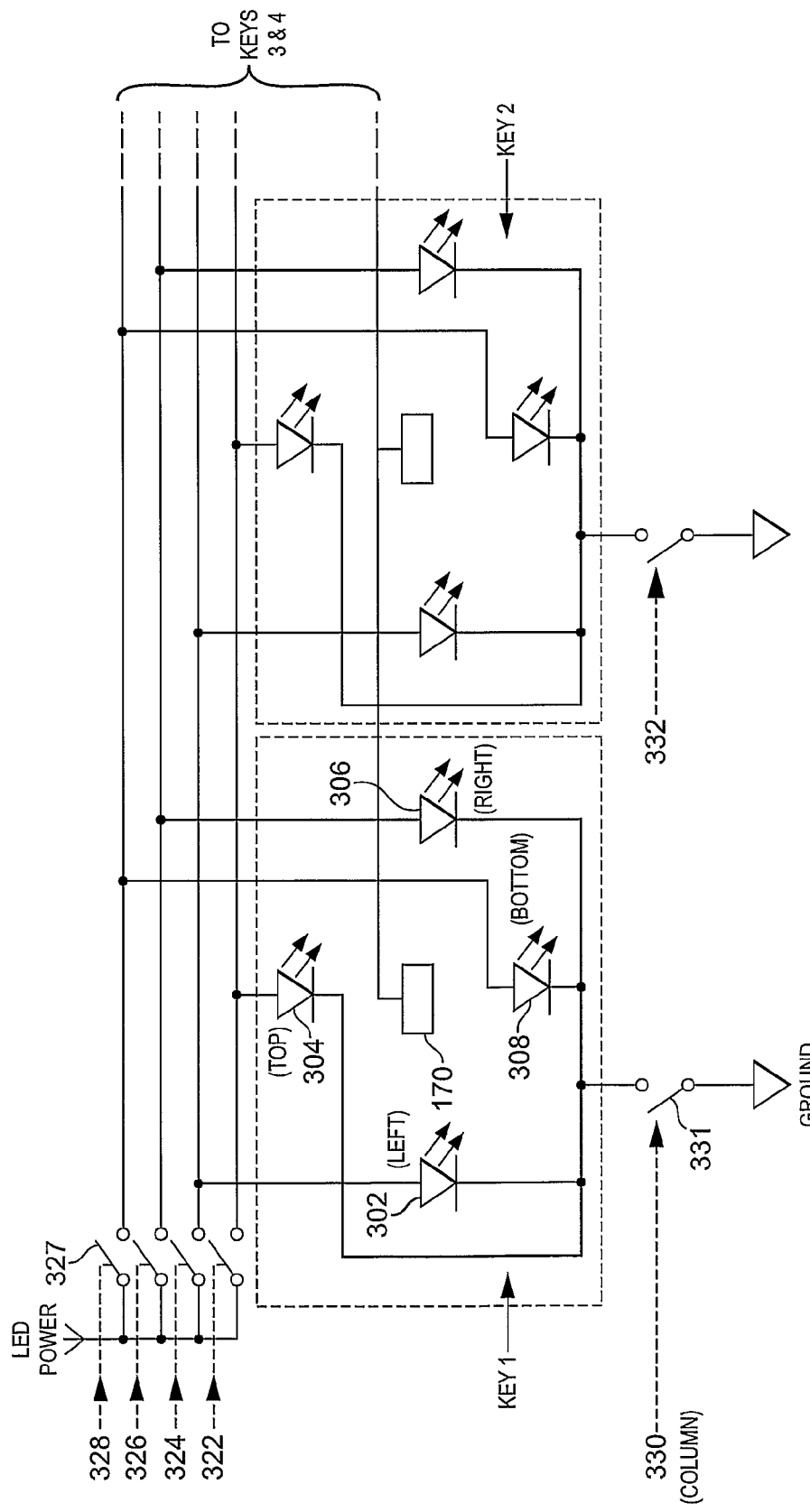
FIG. 7 is a schematic diagram of the operation of the key scanning electronics for two keys within a strip.

As described above, the detection system for detecting not only the event of key actuation but also pressure, roll and yaw values includes a single photo detector 170 per key together with multiple—in this case four—LED or other light or radiation emitting elements 302, 304, 306, 308 as shown in FIG. 7. In the embodiment shown, the four LED emitters are provided at 90° intervals allowing easy mathematical processing to assess the manner of actuation of the key but it will be appreciated that other numbers of LEDs and distributions can be provided. For example three LEDs at 120° intervals provide sufficient information to derive all aspects of key actuation. In the embodiment shown, the photodetector is a photodiode although other photodetectors such as a phototransistor may be used as an alternative.

In addition, a processor which can be any appropriate processor such as a CPU (not shown) is provided and controls, in conjunction with a clock 320 both cycling of the LEDs and synchronization of detection at the detector 170. It will be noted that in operation the multiple detectors 170 may be provided each with respective sets of LEDs and controlled by a common clock in conjunction with a single or respective processors and a single or multiple sampling amplifiers.

Figure 8:
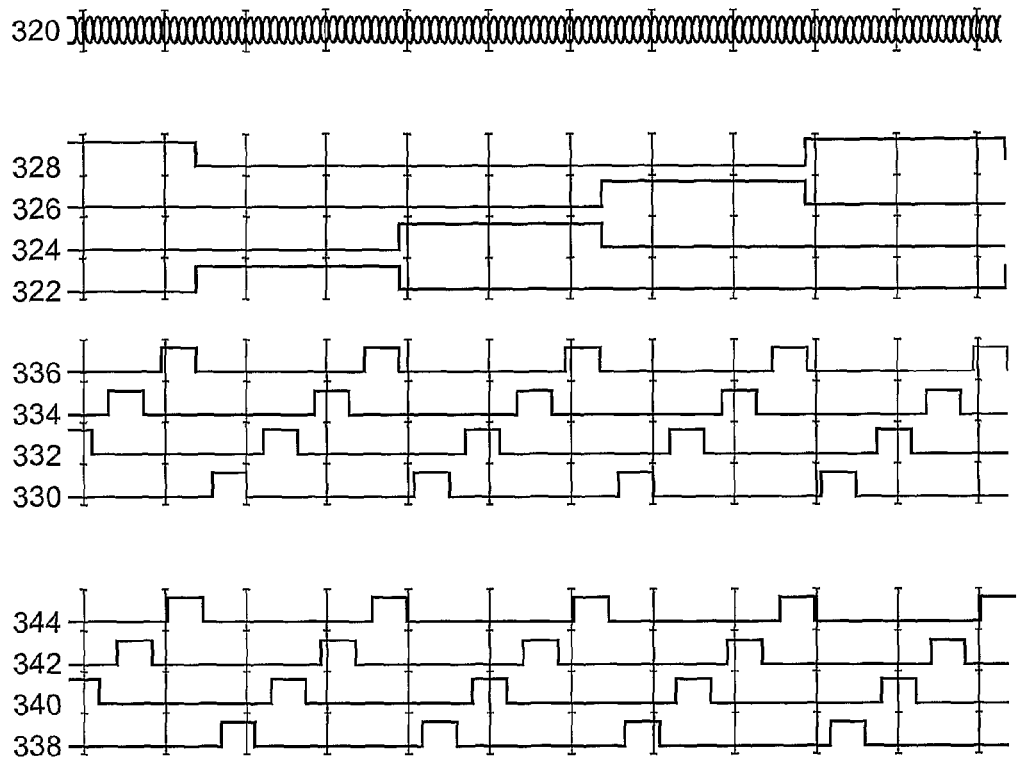
FIG. 8 is a representation of the digital control sequence used to scan strips of keys (in this example, two keys of a strip of four keys)

From the point of view of the control electronics, the keys can be thought of as being grouped together into several 'strips' of keys, each of which share common scanning circuitry. FIG. 7 shows a simplified schematic of the key scanning electronics for 2 keys within a strip. FIG. 8 is a representation of the digital control sequence used to scan several strips of keys (in this example, 2 strips of 4 keys per strip). Referring to FIG. 8, for, say, the first strip of keys, it will be seen that the clock generates a clock signal 320 which provides a timing and synchronization signal for the processor, emitters and detector.

'Row' control signals 322, 324, 326, 328 are applied to switches 327 (for example FET's—Field Effect Transistors) that supply a power signal to all of the top LEDs in each key of a strip, all of the left LEDs, all of the Right LEDs and all of the bottom LEDs, respectively.

Column control signals 330, 332, 334, 336 are applied to switches 331 that connect each of the four LEDs within a single key in the strip to ground, such that signal 330 controls the first key of a strip, 332 the second key, and so on.

Together the 'Row' and 'Column' control signals form a matrix which allow each individual LED in a strip to be switched on separately. Both the Row and Column signal for each LED must be on for the LED to be lit. For a strip of keys, therefore, a sequence of 16 Row and Column signal combinations is used to light each individual LED one after the other. Each of the signals 330 to 336 include an on phase that is less than a quarter of the duration of the on phase of the signal 332 to 338 and are treated sequentially such that, while signal 322 is in the on-state then each of signals 330, 332, 334, 336 is sequentially the on state. Accordingly, during this time, each of the top LEDs in the first strip of keys are sequentially lit.

The signals 330 to 336 again switch through sequential on states while signal 324 is in the on state as a result of which each of the left LED's in the first strip sequentially switch on and so forth. It will be seen that similarly, each of the LEDs in the second strip are sequentially switched by signals 338, 340, 342, 344.

Figure 9:
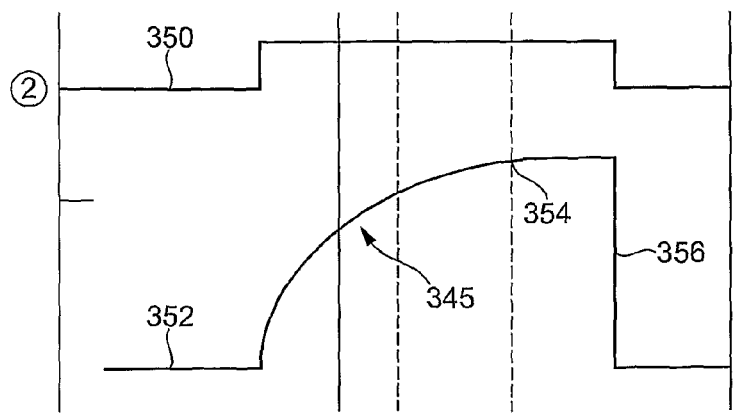
FIG. 9 shows the control signal used to switch on an LED (top signal) along with the amplified and filtered signal generated by the photodetector as a result of an LED being lit (bottom signal)

Furthermore the detectors in a strip are connected to a common amplifier/filter (not shown). The filter has a slow response (time constant) as shown in FIG. 9 selected to ensure that the amplifier just approaches its maximum output voltage 354 (for the amount of light currently reaching the associated photo detector) during the length of time that a single LED is lit. This provides optimal filtering for noise. The amplifier output is sampled by an analog to digital convector (ADC—not shown) common to all keys close to the end of the LED 'on' period. This is achieved by briefly closing a switch from the amplifier to the ADC, with the control signal 349.

It will be noted that the column signals, for example signals 330 and 338, for key 1 in the first and second strips of keys are slightly staggered. This allows for an improved detection system at the ADC which can be further understood with reference to FIG. 9a. The amplifier sampling period is triggered by control signal 349 which switches on at the end of control signals 330-336 for each LED, such that the detector is sampled briefly at the end of each LED illumination period. The other strips of keys are scanned in an identical way, but with a small offset in time. Because the ADC reading only takes part of the total time that a single LED is lit, it is possible to take several readings with the ADC during an LED 'on' period, requiring just a single ADC. This allows the strips of keys to be scanned in parallel, with the 'row', 'column' and crowbar control signals for each strip offset slightly in time. This is illustrated in FIG. 8 by showing the column control signals 338-344 for the second strip of keys, which are slightly offset in time from the column control signals 330-336 of the first strip of keys.

An alternative scanning approach is also used, where each strip of keys has its own ADC. In this case all strips can be scanned together in parallel, and therefore the sets of control signals associated with each strip of keys do not need to be staggered in time.

Figure 9A:
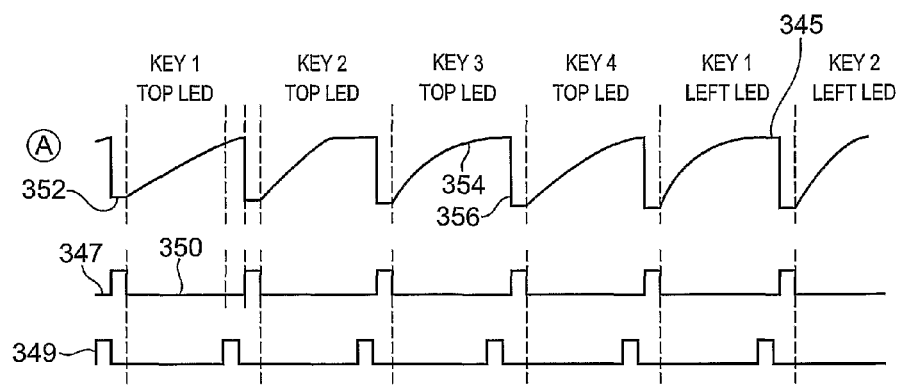
FIG. 9a (top signal) shows a sequence of photo detector signals generated as a result of a sequence of LEDs being lit in turn. The bottom signal represents a control signal used to 'reset' the photo detector output back to zero before the next LED in the sequence is lit.

In order to allow for optimal noise filtering of the amplified photodetector signal, once the signal has been sampled by the ADC it is "crowbarred" or grounded using the control signal 347 shown in FIG. 9a as can be seen at 356 so as to discharge the device and ensure that on the subsequent detection cycle the value starts at zero.

'Crowbarring' is a normal electronic technique that will be known to the skilled reader, used to clamp a signal to a fixed value quickly. However its use according to the present aspect provides a surprising effect. A problem with the amplification of the signals from the photodetectors is the tradeoff between noise and amplifier settling time. A rapid settling time implies a wider bandwidth amplifier which produces a lot more noise. However the present approach allows an amplifier configured to have a much lower bandwidth. At the point its value is sampled it has not settled fully to its final output. However as it is possible to determine the sampling time very accurately timing accuracy is traded for absolute accuracy in the amplifiers, giving a consistent result. The crowbar is needed to return the amplifier to exactly the same initial state each time in order to prevent the value from one sampling iteration affecting the next, thereby avoiding crosstalk between sensors.

In addition it will be noted that the specific amount of depression of the shutter associated with each LED can be computed from the information provided. In particular, through one detection cycle whereby all four LEDs around the detector are illuminated in sequence, the corresponding voltage value from the detector is sampled and stored. This voltage value, is of course, representative of the amount of light reaching the detector from each of the LEDs which in turn is a measure of the level of depression of the key in that direction and the corresponding interruption of the light signal by the shutter. It will further be noted that the system can include any number of keys in any configuration together with one or more alternative function key such as a control key, operating in the same manner as discussed above.

In one embodiment, during a calibration phase, the specific relationship between the amount of depression of the shutter and the corresponding signal at the detector can be correlated and stored. For example the key can be depressed by a series of increasing, known amounts and the corresponding voltage signal for each amount identified. Then a lookup table can be created correlating each depression value with the corresponding voltage value. In operation, therefore when a specific voltage value is detected at the detector, the corresponding depression value can be derived from the lookup table for example by linear interpolation or a more sophisticated interpolation function dependant on the calibration techniques adopted. Values such as roll and yaw can be obtained by comparison of sensed values of depression of opposing edges of the key.

The raw sensor data consists of four 12 bit values per key, one per left, upper, right and lower edges of the key top. Each sensor is scanned at a rate of 2 kHz. For example in one embodiment the calibration process generates a set of readings of key sensor values and the corresponding force exerted on the key. From this data, for each edge, a number of points are generated corresponding to equal divisions of sensor reading between the minimum and maximum values (at the ends of the key's excursion) and the corresponding key forces as measured on a calibration jig. These forces are normalized and placed in a data structure which performs a piecewise linear interpolation to convert a raw sensor reading into a normalized force value.

Changes to the sensor zero value can affect the sensitivity of the sensor to human touch as it is used. If the user presses down with a positive force on a force sensor for some seconds the materials in the sensor distort into a new shape. If a force sensor system is sufficiently sensitive then it will suffer from the effects of hysteresis in the physical materials from which it is made. When the sensor is then released, the distortions may mean that the sensor either continues to indicate that it is still experiencing the application of positive force or, if the system has distorted in the opposite direction, the application of negative force. Some of these distortions will last for a finite time and will have a number of effects on the accuracy of the sensor. Slow changes in the sensor caused by thermal variations may also cause the sensor to become inaccurate.

The system that determines whether or not a key has been pressed (which might be, for example an electronic or software system) now has one of two outcomes. In the first case the system will still seem to be above the sensor zero value thus indicating that force is still being exerted, and it will remain this way until all the materials in the sensor have relaxed back to their original shape, which might take some time. In the case of a musical instrument this can result in a note becoming 'stuck on'. In the second case the value from the force sensor is now below the zero force value by some amount and will now require the application of increased force in order to trigger the minimum force value. In the musical case this results in a key that has become less sensitive as a result of being played. In addition to the hysteresis effects, components of the force sensor may sometimes also exhibit resonant behavior during rapid changes in the applied force, particularly when the force drops from a large value to zero in a short period of time. Both of these results are undesirable and the present invention addresses these problems. In order to be able to determine if a force has been applied to the sensor the effective zero value is adjusted during the time that it is pressed to accommodate the changing material shape, and when it is released from the applied force it is modified to reflect the relaxation. It is also desirable that the process that determines the zero force value may account for the presence of oscillations.

In the particular case of a human touch interface, and in the even more particular case of one used for the production of musical sounds, the invention recognizes the possibility of taking advantage of some human behavior. Whilst one often plays notes that start very quietly and then crescendo loudly, it is extremely rare that one starts with a loud note and very slowly eases it all the way to off. Normal behavior when slowly applying diminuendo to a note is to apply it for a while until the note is fairly quiet and then just ease all the way off quickly. Using this fact enables the application of a simpler method for maintaining the force sensor zero value that does not require full modeling of the physical system and can be realized in simple hardware or software, as the cases of crescendo or diminuendo are particularly accommodated.

Figure 9B:
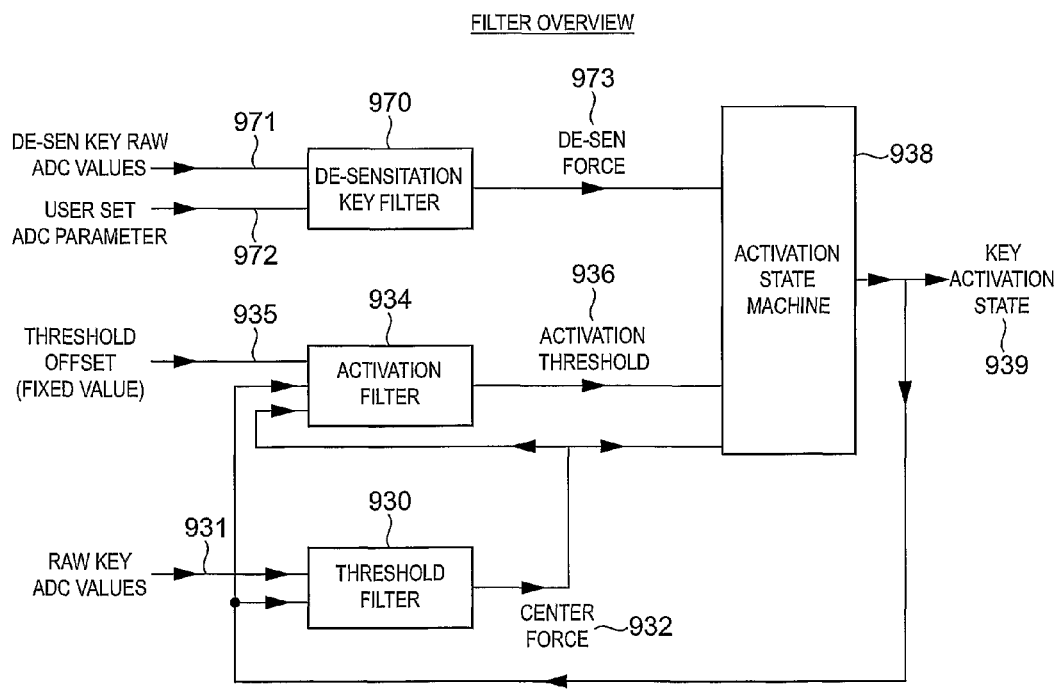
FIG. 9b is a schematic view showing use of filters in the signal processing.
Figure 9C:
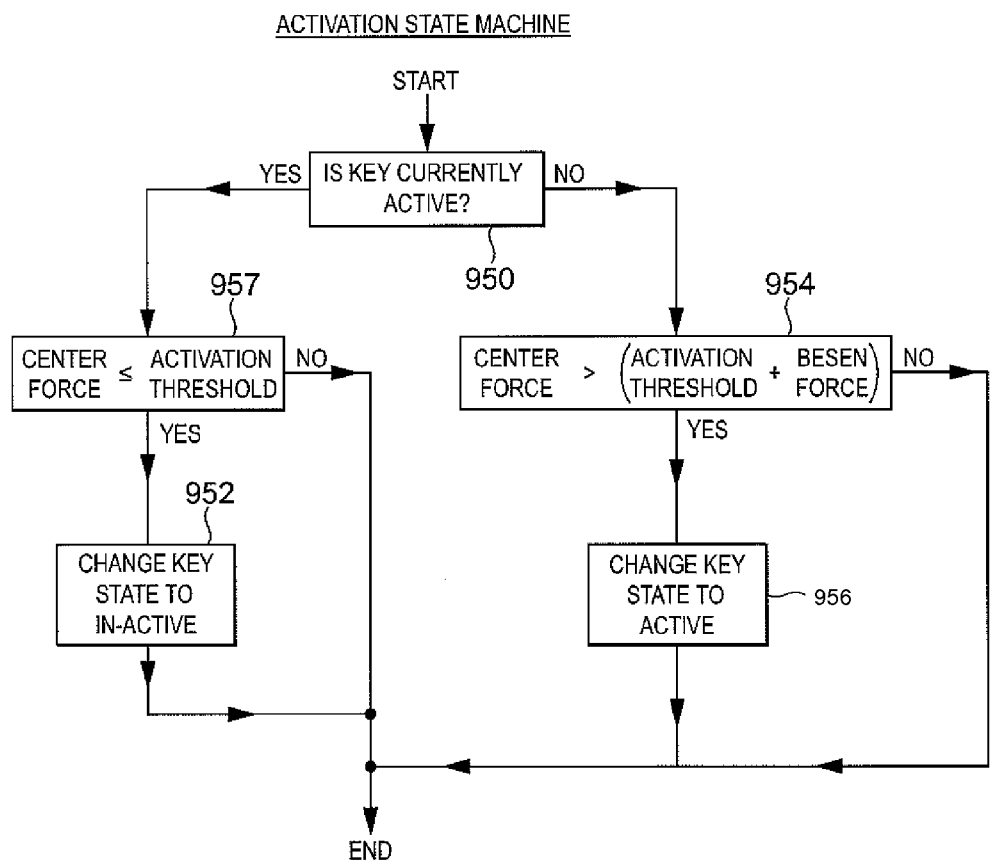
FIG. 9c is a schematic view of a state diagram corresponding to FIG. 9b.

The manner in which this is achieved can be understood from FIGS. 9b and 9c. Referring to FIG. 9b a threshold filter 930 generates an output value that represents the force applied to the key (CENTER FORCE). To do this it uses a Low Pass Filter (LPF) with a long Time Constant (TC) to generate a baseline 'zero' level for a key when it is not being pressed based on the raw ADC values 931. The Low Pass filter thus compensates for long term drift in the baseline 'off' reading from the key, due to (for example) thermal effects in the electronics. The output 932 of the threshold filter (CENTER FORCE) is an averaged reading for the key and will represent the force applied to the key plus any mechanical or electrical noise (thermal noise, mechanical cross-talk from adjacent keys etc).

The threshold LPF is turned off (retains its previous value) when the key is active, and also for a short period such as 5 seconds after the key has stopped being active to prevent the zero level from changing whilst the key is being played or is mechanically settling after having been played. A shorter Time Constant is used in the LPF for the first 20 seconds after the instrument is powered up. This is because there is an initial change in ADC readings for the zero level whilst the electronics warms up. This allows the filter to react to this change more swiftly.

An Activation Filter 934 takes the CENTER FORCE value from the Threshold Filter (i.e. the sensor level representing the force applied to the key) and uses this to generate an ACTIVATION THRESHOLD value 936. This is the threshold used to determine whether or not the activation state of the key has changed. In order to generate the ACTIVATION THRESHOLD an additional fixed THRESHOLD OFFSET value (935) is added to the CENTER FORCE (generating the OFFSET FORCE). This is used to compensate for electrical and mechanical noise in the system by effectively increasing the ACTIVATION THRESHOLD by a value that represents the maximum expected noise.

As described in more detail below, in addition, a de-sensitization key (or 'dummy' key) is provided mechanically identical to a standard keyboard key but not intended to be used as a performance interface, but merely to mirror the mechanical properties and hence provide a control value allowing detection and desensitization, for example, to sympathetic resonance or mechanical knocks. It will be noted that these can be manifested as both positive (key depress) forces, as encountered by a standard key, but also as a negative force for example from resonances.

A de-sensitisation filter 970 has as inputs the raw sensor ADC values 971 and uses a first stage key filter that is identical to the key filter of a normal key, including the storage of the active/inactive state. The active state is only used internally, however, to control the filter characteristics of the Low Pass Filters in the key filter. Values from the 'normal' Threshold Filter are then used to generate an absolute force value for the 'dummy' key. This produces an output when the key is going up from the zero level filtered value as well as down. This absolute force reading provides a good indication of the magnitude of any un-wanted transients on the other keys due to external factors such as the instrument being knocked, or sympathetic resonance.

The absolute force value for the 'dummy' key is scaled using a user settable parameter 972 and the scaled force is then passed through a Low Pass Filter with a reasonably short time constant. The output of this LPF is a DESEN FORCE value 973 which can be used to de-sensitize the activation of the main keyboard keys as discussed below.

The activation filter has 3 different modes of operation and the ACTIVATION THRESHOLD value is generated from the OFFSET FORCE value dependent on the mode, taking into account, inter alia, whether the user is inputting crescendo or diminuendo. This is implemented by the state machine 938 to identify the key activation state 939 by comparing the ACTIVATION THRESHOLD from the Activation Filter with the CENTER FORCE from the Threshold Filter, and change the activation state accordingly, and can be further understood from the state diagram of FIG. 9c:

In the first, "active" mode, if at step 950 the key is active then at step 957 the last value of the ACTIVATION THRESHOLD prior to the key going active is stored, a fraction of the OFFSET FORCE is mixed with the stored value of the ACTIVATION THRESHOLD. This is passed through a Low Pass Filter with a relatively short time constant to generate the new ACTIVATION THRESHOLD. This allows the ACTIVATION THRESHOLD to track quick or slow downward motion, i.e., increasing applied force and sensor value (normal or crescendo) and relatively slow upward motion (diminuendo) on the key without a change in activation state, as in the case of increasing force it will be greater than the ACTIVATION Threshold as it is recomputed in step 951, and a slowly decreasing force will also be above the recomputed threshold. However the system reacts quickly to swift upward motion (decrease of force and sensor value), as the sensed value falls below the ACTIVATION THRESHOLD value before it has time to decrement, hence de-activating the key at step 952.

In a second, "charging" mode, at step 950 the Key is in-active and going up from mechanical settling. In this case the OFFSET FORCE is passed through an LPF with a short time constant to generate the ACTIVATION THRESHOLD. This allows the threshold to quickly track upwards settling of the spring after the key has been released. The value is further corrected with the desensitization force to filter out externally induced transients and at step 954, if the sensed CENTER FORCE is less than the desensitized ACTIVATION THRESHOLD, then the key state remains inactive. Otherwise at step 956 the step is set to ACTIVE.

In a third, "discharging" mode, the Key is in-active and not going up, i.e., has settled. In this case the OFFSET FORCE is passed through an LPF with a relatively long time constant to generate the ACTIVATION THRESHOLD and step 954 can be repeated. This helps prevent the threshold from reacting to noise once the spring has settled.

The charging time constants are set by the material characteristics and design of the force sensor system, for example taking into account the resonant characteristics of the force sensor system to avoid inadvertent triggering of the sensor by oscillations caused by force release. The noise threshold is determined by both the noise inherent in the sensor system and by the degree of sensitivity to small forces desired in the total system. It is also determined by the speed at which thermal effects may make the sensor value drift as it interacts with the time constant described below for the thermal filter. If it is not sufficiently large then changes in value caused by temperature differences may cause false triggering before the thermal filter has effect.

The threshold filter may be for example a one pole IIR low pass with a long time constant of the order of one minute.

The activation filter may comprise a one pole IIR low pass filter with a time constant of the order of 0.1 seconds, when the key is active; of the order of 0.05 seconds, when the key is inactive and the input value is less than the previous output; and of the order of 5 seconds, when the key is inactive and the input is above the previous output. When the key is active, the input to the activation filter is scaled by a factor SCALE, which is less than 1, typically 0.2, so that the activation filter charges up to a fraction of the input value.

Figure 11A:
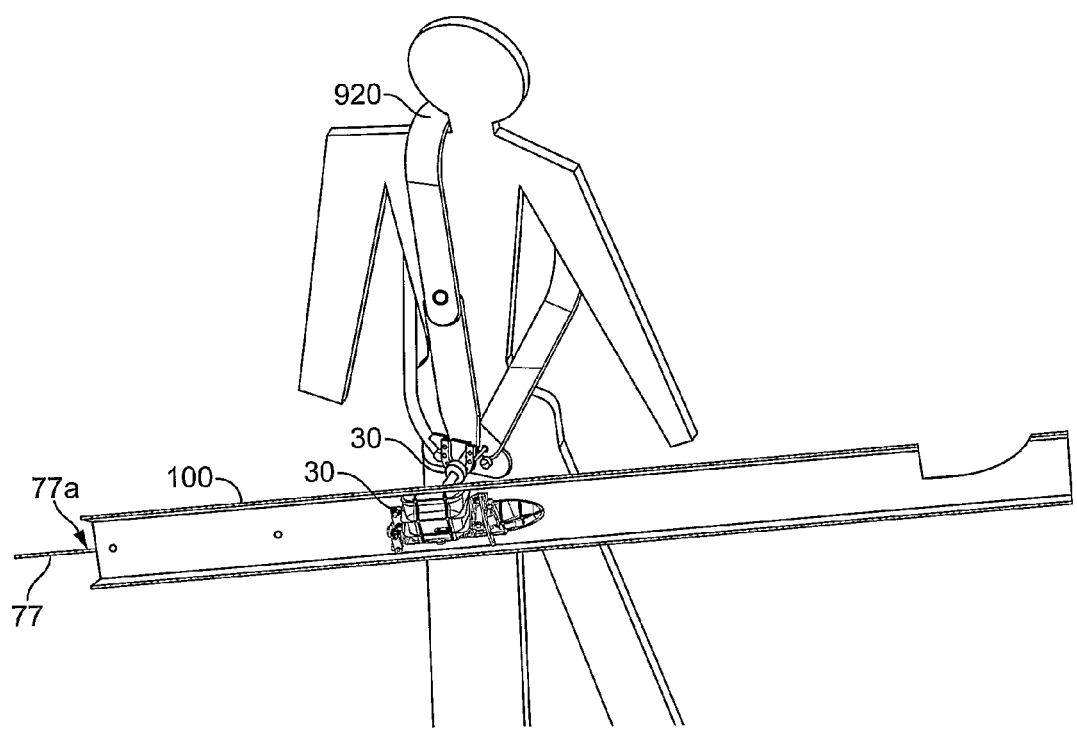
FIG. 11a is a front view of a schematic of a user wearing a sound-creation instrument showing an embodiment of a strap and attachment means.

In one embodiment the values are:
Activation Filter Active time constant: 100 ms
Activation Filter Active coefficient 0.2
Activation Filter Discharge time constant: 50 ms
Activation Filter Charging time constant 5 sec
Threshold Filter time constant: 50 s An embodiment of the musical instrument is shown in FIG. 11a. The musical instrument 100 will, in use, be subjected to physical shocks through general usage, wear and tear and will also be exposed to sounds from outside of the instrument. This can cause a problem in that the keys 125 of the musical instrument 100 could be shocked or the spring component 200 of the keys 125 could be excited by resonant frequencies from external noise. In a live situation for example, a positive feedback loop might form between the mechanical key resonance and an external sound system. This could adversely affect the sensitivity of the optical sensor 140 and the performance of the keys 125. In order to address this problem a dummy key 950 is mounted inside the musical instrument 100, for example it may be mounted on the PCB 150 but not exposed to the user of the instrument. The dummy key 950 cannot be played by a user, but is comprised of a complete key assembly 125, including optical sensor 140, key sub 260, key top 215, key seal 250 and housing 220. The dummy key 950 is electronically connected via the PCB 150 to the processor 106 where activation of the key 950 is detected in the same manner as with the playable keys 125.

If activation of the dummy key 950 is detected, it can be concluded that the musical instrument 100 has been subjected to a physical shock or to an external noise causing a resonant frequency at the keyspring 200. Whatever the cause of the activation, it will trigger the processor 108 to de-sensitize the detection of signals received from the playable keys 125 by an amount substantially the same as, or a little more than, the signal detected at the dummy key 950. Thus the user can continue playing the keys 125 even if the instrument 100 has been knocked by accident or has been adversely affected by external noise.

Alternatively, the key may be placed on the outside of the instrument where it may also serve the function of a 'mute' key that desensitizes the whole instrument to the degree with which it is pressed. A gesture recognition on that key (a deflection sideways for example, instead of straight down) latches the muting effect on or off.

It will also be noted that the form of the dummy "key" can match any physical form of the user input. For example in feedback suppression of acoustic and electric guitars, by building in dummy strings for example, the output value of these can be used to desensitize the instrument (by turning down its volume). In any case, the use of a sensor attached to the instrument that shares the same mechanical characteristics (perhaps including the resonant frequencies, etc.) of the active sensors used for actual data input, allows the output (the filtered output in fact) to be used to desensitize the other sensors.

It will be noted that the functionality of picking up mechanical shocks may alternatively be replicated by the use of an accelerometer in the instrument which can also be used to provide performance data.

Instrument Frame

In an embodiment, the PCB 150 has an array of key assemblies 125 assembled thereon, for example a full scale musical instrument may include an array of 5×24 keys whilst a smaller version may include only 3×6 keys. At least the full scale instrument is designed to have an ergonomic and aesthetic curved frontage, as seen for example in FIG. 11a. A smaller version may have a more conventional flat-fronted keyboard. In either case, the key assemblies 125 may be located in very close proximity to each other on the PCB 150. The sensitivity of the optical sensor and key assembly is particularly high and may detect movement of the key with a sensitivity of as little as 0.9 micrometers. It is therefore very important that the keys are not affected by movement of adjacent keys. For the flat-fronted keyboard, minimization of this "cross-talk" between adjacent keys is achieved by using a rigid cast frame (not shown) that fits over the keys and clips into a rigid base of the instrument to provide a uniform clamping action, over the whole keyboard, of the keys between the base and the frame. This prevents any cross-talk between keys that may otherwise occur via the rubber seal 250 of the keys and also provides the front cover for the instrument.

Figure 17B:
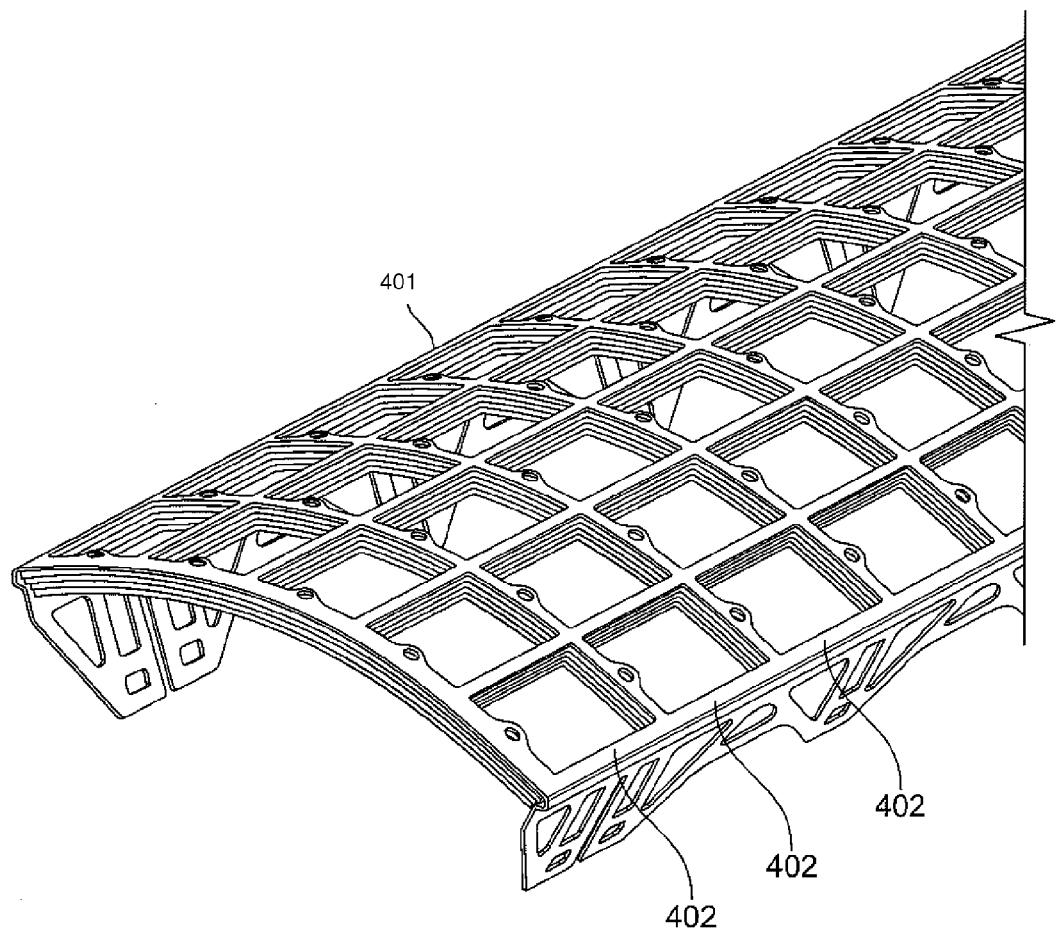
FIG. 17b is an exploded view of the over-frame for the sound-creation instrument.

However, for the curved-fronted version of the instrument, the frame 400 is laminated as this is a more cost viable solution than other possible forms of manufacture such as CNC machining. The laminate structure provides the rigidity required to uniformly clamp the rubber seal 250 of each key between the key assembly and the frame as described above such that the clamping force is evenly distributed. FIG. 17b shows a perspective view of a portion of an example laminated frame, whilst FIG. 17a shows an exploded view of the frame layers. The frame comprises a laminate structure manufactured from aluminium or steel. In the example shown, the laminate structure comprises four thin chemically milled metal under-cages that are glued or otherwise stuck together to form a rigid, curved frame. The outer cage 401 is attached to and pulled towards the instrument base using springs or other fixings (not shown). The laminate structure produces a strong, rigid frame even though it comprises apertures to accommodate each key. The frame may also provide a front cover for the musical instrument through which substantially only the key top 215 and the tip of the feedback LED 340 protrudes. The rigidity of the frame minimizes the risk of the playing of one key causing detection of movement in the key assembly of the adjacent key.

Breath Controller

Figure 10A:
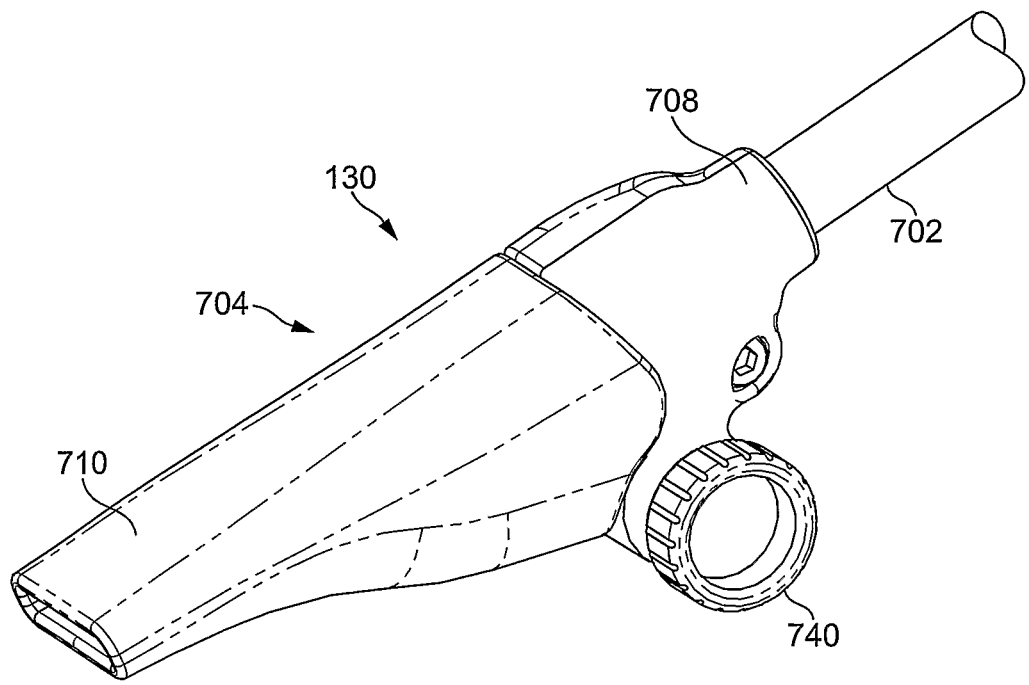
FIG. 10a shows an embodiment of a breath controller.
Figure 10C:
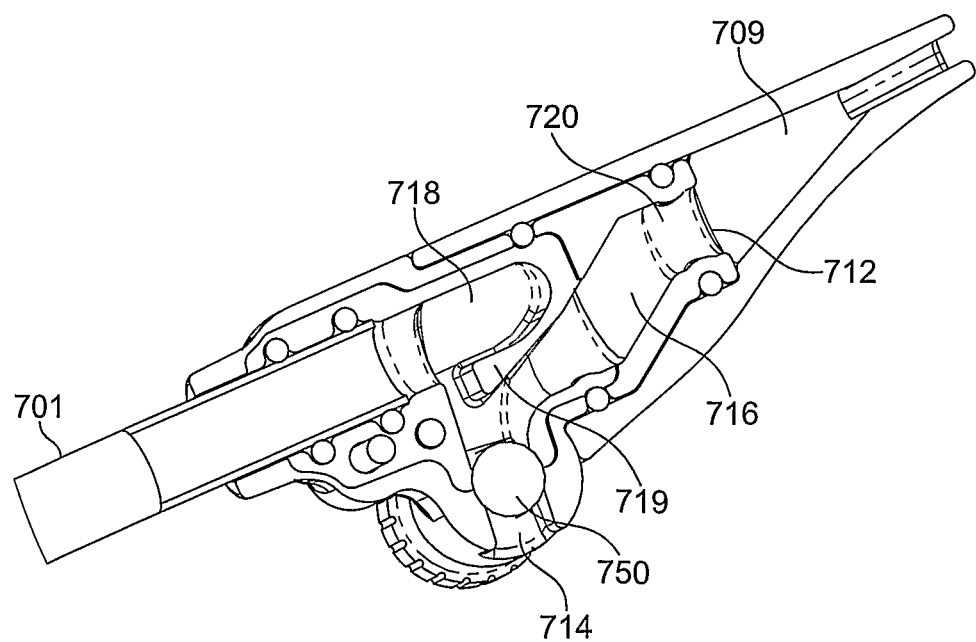
FIG. 10c is a perspective view of a section through the valve body of the breath controller of FIGS. 10a and 10b.
Figure 10B:
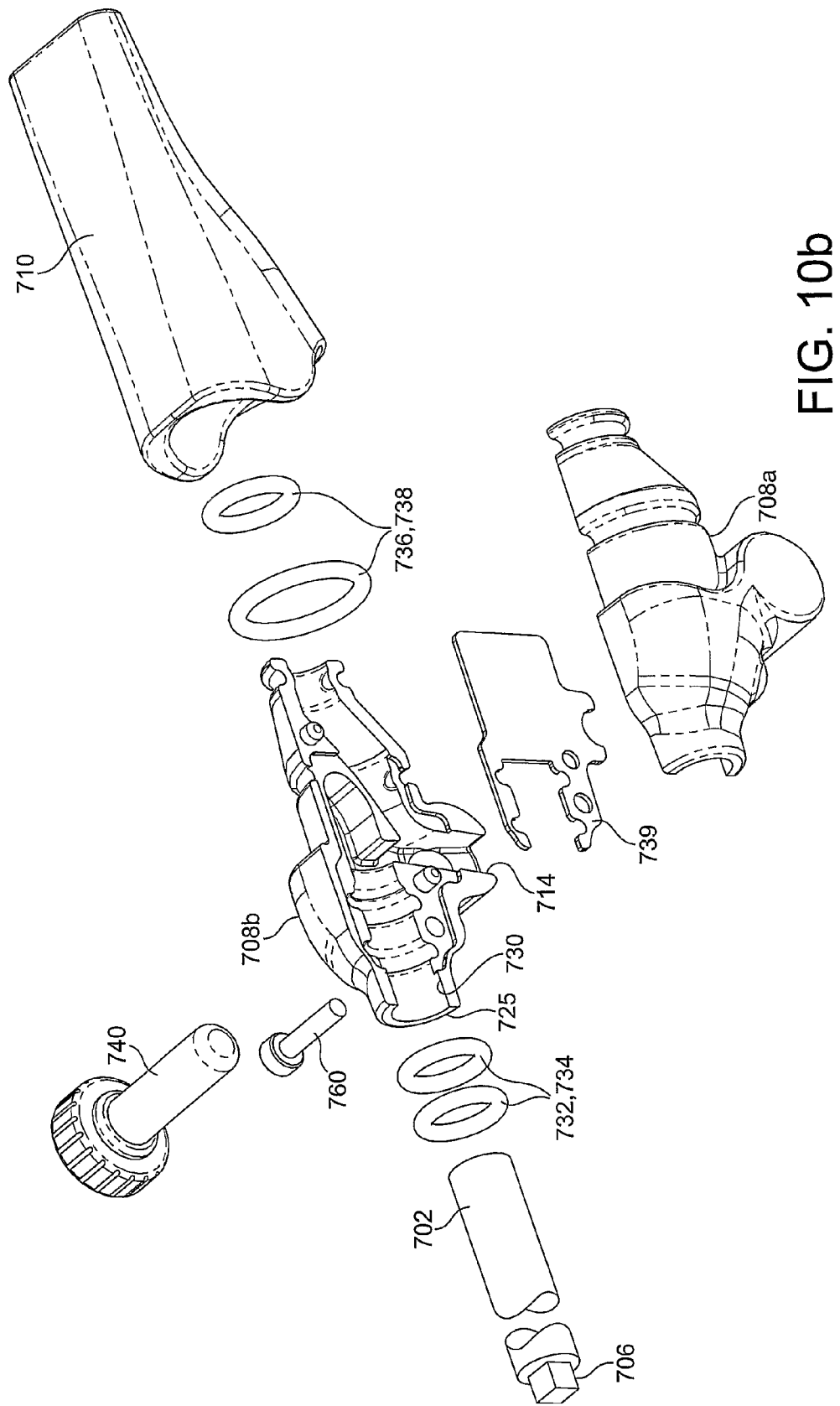

In addition to the keys 125, a musician may utilize a further input, namely a breath controller 130. An embodiment of the breath controller 130 is shown in FIGS. 10 a, b and c. The breath controller 130 consists of a breath pipe 702 that has a proximal end 701 that is in fluid communication with a mouthpiece 704, and a distal end in fluid communication with pressure transducer 706. The mouthpiece 704 comprises a valve body 708 which consists of two halves 708a, 708b as seen in FIG. 10b, and an interchangeable portion 710 through which a user may blow, suck or hum to create static pressure inside the valve body 708. The interchangeable portion defines an internal cavity 709 that is shaped to conform with an exterior surface of the valve body 708 such that the interchangeable portion 710 snap fits onto the valve body exterior surface and is removable to allow different players to share the musical instrument 100 and to use the breath controller 130 with an increased level of hygiene.

The valve body 708 comprises a molded rigid plastic component molded in the two halves 708a,708b but are substantially symmetric to each other about the plane at which they are joined together as shown in FIG. 10b. The valve body includes an airflow inlet 712 and an airflow outlet 714 defining a valve cavity 716. When the interchangeable portions 710 is attached to the valve body 708, the internal cavity 709 and the valve cavity 716 together define an airflow cavity 720 through which air flows during use of the breath controller. The pressure chamber 718 is offset from and is separated from the airflow cavity 720 to a large extent by dividing wall 719 such that air does not flow through the pressure chamber 718 during use of the breath controller. This arrangement reduces the build up of spittle and condensation in the pressure chamber 718 as a user blows, sucks or hums into the interchangeable portion 710. However, the pressure chamber 718 is in fluid communication with the airflow cavity 720 such that as a user creates airflow through the cavity, a positive or negative static pressure is generated in the pressure chamber 718 depending on whether the user has blowed, sucked or hummed into the mouthpiece.

The valve body 708 further comprises an aperture 725 defining an entrance into an interior channel 730 that is in fluid communication with the pressure chamber 718 at an end of the valve body opposite to the interchangeable portion 710. The proximal end 701 of the breath pipe 702 is received in the interior channel 730 for attachment to the mouthpiece 704. Two pipe seal O-rings 732,734 are fitted inside the channel 730 around the pipe 702 to provide an airtight seal of the pipe inside the valve body 708. This ensures that any static pressure generated inside the pressure chamber 718 is sealed from the environment and is also generated in the breath pipe 702. Similarly, O-ring seals 732,734 are provided at the airflow inlet 712 at an exterior surface of the valve body 708 in order to seal the interchangeable portion 710 on the valve body. A gasket 739 is fitted between the two halves 708a,708b of the valve body in order to provide airtight seal between the two halves of the valve body. The mouthpiece 704 is thus airtight other than at the airflow inlet 712 and airflow exit 714.

A variable bypass valve 750 is located at the airflow exit 714 in order for the user to be able to adjust a rate of airflow passing through the airflow cavity 720 and hence to adjust the static pressure generated in the pressure chamber 718. The variable bypass valve 750 comprises an adjustable thumb screw 740 located on the exterior of the mouthpiece, the shank of which is passed through an aperture in the valve body 708 close to the air exit 714, the aperture being perpendicular to the airflow exit 714 such that the further the screw is pushed or turned into the valve body, the more it closes off the bypass valve 750, reducing the cross-sectional area of the airflow path in/out of the airflow cavity 720, altering the static pressure generated in the pressure chamber 718. The user may thus adjust the thumb screw to adjust the rate of airflow through the bypass valve 750. In another embodiment, the variation of airflow through the bypass valve could be achieved via another appropriate type of valve such as a ball valve or a gate valve.

The valve body halves 708a,708b are joined together with a fixing screw 760 in this embodiment although any appropriate fixing means may be used. The O-ring seals 736,738 allow the mouthpiece 704 to be rotated with respect to the breath pipe 702 to provide an optimal playing angle for the user.

In use of the breath controller, a user may blow, suck or hum into the interchangeable portion 710 of the mouthpiece 704. This action creates an airflow through the airflow cavity 720. The rate of airflow through the bypass valve 750 can be controlled by adjusting the thumb screw 740 to increase or decrease a rate of airflow through the valve. The airflow generates a static pressure in the pressure chamber 718 that is proportional to the flow rate through the valve and the airflow cavity. The static pressure is sensed at the pressure transducer 706 at the distal end of the breath pipe 702. The transducer, present in the musical instrument 100, converts the sensed pressure into an electrical signal for processing by the electrical-processor interface 106 of the musical instrument 100. Spittle and condensation generated during use of the breath controller are vented through the airflow exit 714.

Instrument Strap and Strap Attachment

Referring to FIG. 11a, a strap 920 is provided in order that the instrument 100 can be hung from a user's body. The strap is attached to the instrument via an attachment means 30 that allows the instrument to pivot around its exact center of mass, affording the musician the maximum number of possible playing positions and ease of change from one playing position to the next.

The instrument sits best on the user in an off center position and at approximately hip level. In order that the instrument hangs in this position, the strap 920 consists of a main strap 921 and a substrap 922, seen in FIGS. 11b, 11c and 11d. With reference to FIGS. 11b, 11c and 11d, the main strap 921 hangs over the shoulder of the user in a normal manner to the front of the user, terminating at the attachment means 30 to which it is fastened by rivets or other appropriate fastening means. FIG. 11c shows a rear view of a user wearing the strap 920. The main strap 921 is worn such that the strap curves down and across the back of the user and around the user's waist, from where it hangs at the user's front and is clipped to the attachment means 30. The substrap 922 is shown in FIG. 11c to depend from the main strap 921 along the upper curved part of the main strap at the rear of the user. The substrap 922 is clipped to the attachment means as seen in FIG. 11b and FIG. 11d. The substrap 922 therefore locates the instrument 100 in an off center position on the user and prevents it from reverting to a central position. Both the main strap 921 and the substrap 922 are adjustable so as to allow the user to reposition the strap relative to his or her body. The main strap, for example, can be adjusted at a front buckle 923, whilst the substrap 922 can be adjusted at the point of attachment to the main strap. The main strap 921 includes a rigid portion 924 that extends from the point of connection with the back plate 16 to approximately just above the breast of a user. The rigid element 924 produces a lever force that is necessary to support the instrument on the attachment means.

The attachment means 30 slots into a recessed pocket 20 in a base 405 of the body of the musical instrument 100 in order that the instrument is hung from its center of mass.

The attachment means comprises a balljoint device that allows the user to adjust the friction applied to the pivot from very little (substantially free movement) to a fully locked-off state in which the balljoint cannot be rotated. In the locked-off state, the user can play the keys of the musical instrument with both hands, without having to counterbalance the instrument with the hand that would normally support the instrument, maximizing the flexibility with which a user can create sound using the instrument.

The balljoint device is described as follows with reference to FIGS. 11*e*, 11*f* and 11*g*. The balljoint comprises a pivotable ball 5 that is just seen in FIG. 11*e* and is seen in section in FIG. 11*f*. The balljoint 5 is in operable contact with a friction pin 11, via which a user may adjust an amount of locking force on the balljoint during use.

The balljoint ball 5 is operably housed inside a generally cylindrical retaining socket 6, relative to which the ball is pivotable. At a distal end thereof, the retaining socket 6 includes an aperture into which the proximal end of the friction pin 11 is retained. The socket also retains a proximal end of a hollow stem 8 which extends between the balljoint and a strap attachment portion 16, 17 of the attachment means 30. The strap attachment portion 16, 17 of the attachment means is, in use of the instrument, attached to the strap 920 and the stem 8 thus provides a short distance between the player and the musical instrument to allow maximum uninterrupted travel for the user's hands whilst playing the instrument.

Running inside the hollow stem 8 is a friction pin 11, a proximal end 11*a* of which is arranged to come into contact with the ball 5 when force is applied to the distal end 11*b* of the pin. The distal end of the hollow stem 8 is threaded and also houses an adjustment pin 11*c*, an end of which is threadably received in the threaded portion of the stem 8. An opposite end of the adjustment pin 11*c* is affixed to the strap bracket 10. A force may be applied to the friction pin 11*a* via an adjustment screw 12 that can be turned into the threaded portion of the hollow stem 8 at an angle perpendicular to the longitudinal axis of the friction pin 11. Turning the adjustment screw causes the rotation of the adjustment pin 11*c* either toward or away from the friction pin 11*a*, increasing or decreasing the force applied on the ball joint 5. As force is increasingly applied to the friction pin 11, the friction acting on the ball 5 increases, eventually to the point where the ball 5 has effectively been locked-off and will no longer rotate.

Figure 11F:
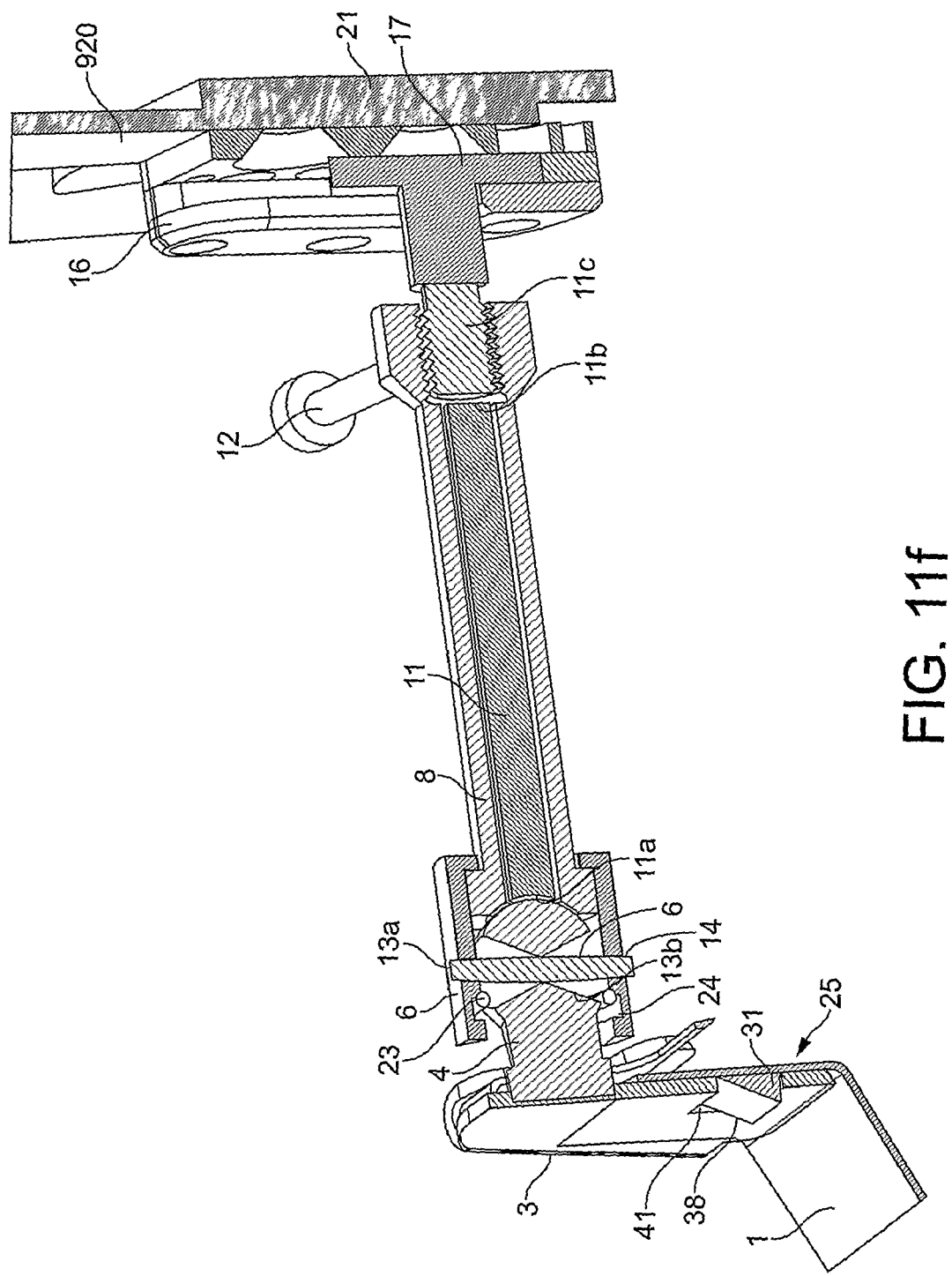
Figure 11G:
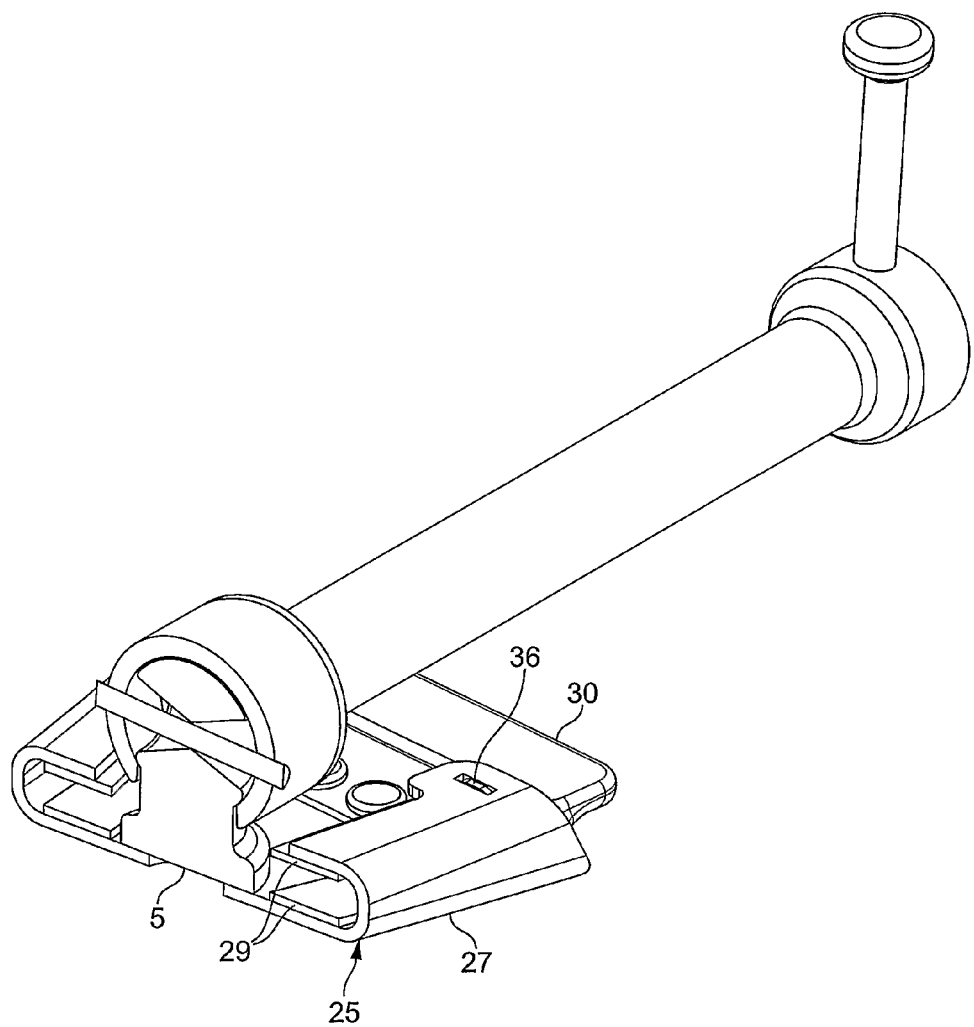

The ball joint 5 is shown in FIG. 11*f* to have two conical or frusto-conical cutout portions 13*a*, 13*b* at directly opposite ends thereof. The cutout portions extend to an angle of approximately 20 degrees from a central axis thereof and meet at the center of the balljoint such that the cutouts extend the entire way through the ball joint. A gimble pin or locating pin 14 extends through an upper surface of the retaining socket 6 as seen in FIG. 11*f*, through the frusto-conical cutouts 13*a*, 13*b* and through a lower surface of the socket 6 such that it is held in place in the retaining socket 6 but is only very loosely in contact with the interior of the ball joint at the narrowest point of the cutouts. Furthermore, the retaining socket 6 comprises a cutout portion 15 in an upper portion thereof as shown in FIG. 11*e*. The gimble pin 14 is aligned perpendicularly with the cutout 15. This arrangement of the conical portions 13*a*, 13*b*, cutout portion 15 and gimble pin 14 allows the balljoint 5 to rotate plus or minus 20 degrees within the socket 6 in any direction. At the extremities of this range, the gimble pin 14 contacts the conical cutouts 13*a*, 13*b* and prevents further movement. However, the cutout 15 in the socket member allows the ball joint to be rotated up to 90 degrees in the direction of the cutout before the balljoint impinges on the socket 6. The gimble pin 14 thus functions as a locating means for the ball joint such that the position of the cutout 15 does not change with respect to the balljoint, ensuring that the balljoint and socket do not rotate relative to the body of the instrument in a manner that could damage the device or inconvenience the user.

The balljoint 5 is retained in the retaining socket 6 by a circlip 23 seen in FIG. 11*f*. The circlip locates into an internal notch 24 in an interior surface of the socket to prevent the balljoint 5 from moving laterally out of the socket. As force is applied to the friction pin 11 in the direction of the balljoint, it is the friction generated between the balljoint 5 and the circlip 23 that creates the locking of the balljoint in position.

Figure 11I:
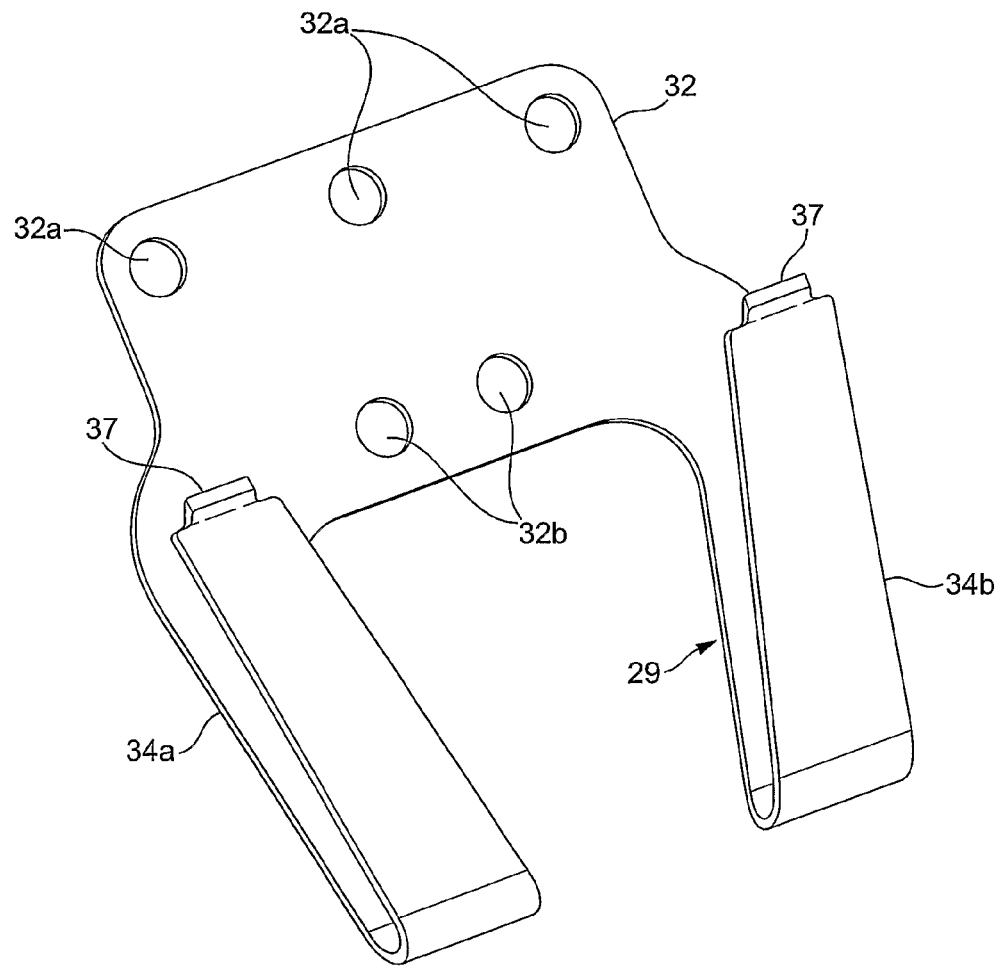
FIG. 11i is a perspective view of a spring of the instrument attachment device of FIG. 11h.

The balljoint is attached at a distal end thereof (opposite the friction pin 11) to an instrument mounting device 25 using screws or other appropriate fixing means. Referring to FIGS. 11*g*, 11*h* and 11*i*, the instrument mounting device 25 consists of an outer shoe 26 which in the present embodiment comprises a folded metal plate having a generally trapezoidal planform so as to form a tapered sleeve having a narrowing cross section from an entrance thereof to an exit thereof. Inside the shoe 26 is received an inner foot 27 that also comprises a folded metal plate fitting snugly inside the shoe 26. The foot 27 functions as a fixing mount for the balljoint 5 and also for a latch mechanism that is received inside the foot. The latch mechanism comprises a folded metal spring 29, a handle 30 and a latch 31. The folded metal spring 29, seen in FIG. 11*h*, is generally trapezoidal in planform so as to fit snugly inside the foot 27. The spring consists of a rear flat portion that includes an upper mounting portion 32 into which rivet holes 32*a* and 32*b* are formed. Below the upper mounting portion are two arms 34*a* and 34*b* that taper inwards towards a longitudinal axis of symmetry of the spring. The arms are folded forwards on themselves to create a U-shaped spring hinge at a lower end of the spring 29, the arms extending back towards the upper mounting portion 32. Each arm terminates in a protuberance 37 that is mateably receivable in a corresponding pair of locating notches 36 in the foot 27 (see FIG. 11*g*).

The latch 31 comprises a 'Chubb'™ type latch having an attachment surface that includes a pair of rivets 39, and a cam surface 38 that achieves the latching. The rivets 39 are used to fasten the latch 31 to the spring 29 via the holes 32*b* in the upper mounting portion of the spring 29. The handle 30, consisting of a plastics or metal element that is contoured for ease of user grip, is attached into the holes 32*a* in the spring 29 using rivets.

The spring 29 and latch 31 is then slotted into the foot 27 until the protuberances 37 on the spring 29 locate within the notches 36 to fasten the spring into place. During this action, the inner surface of the foot 27 rides along the cam surface 38 until the cam surface protrudes through an aperture 41 in the foot 27, clicking the latch into place and locating the spring in the foot. The arms of the spring expand inside the foot to wedge the spring in place.

As seen in FIG. 11*h*, the instrument attachment device further includes a mounting bracket 1 that may be affixed into the pocket 404 in the base 405 of the musical instrument 100 using standard machine screws 2 or other appropriate fixing means. Once the latch and spring are located in position in the foot, a user must pull on the handle 30 to physically pull the latch out of the aperture 41 to remove the instrument attachment device from the bracket 1 in order to separate the strap and attachment means from the instrument 100.

The pocket 20 is conductive and is grounded to the rest of the instrument 100 in order to complete the electromagnetic compatibility shielding of the instrument. The bracket 1 and the pocket 20 are recessed into the base 405 such that the ball 5 can be located at the instrument center of mass.

A distal end of the adjustment pin 11*c* is threadably screwed into a T-section 17 that is clamped between inner and outer sections of a strap mounting plate 16. The strap mounting plate 16 is in turn attached via rivets or other appropriate fixing means to a rigid section 21 of the main strap 921. The main strap 921 passes over a shoulder of the user as previously described and is attached at its other end to strap mounting plate 16 with a sprung clip 23 such that the instrument is firmly and comfortably hung from a users body. The strap can be easily unhung by detaching the clip 23 from the strap mounting plate 16.

There will be occasions when a user wishes to play the sound-creation instrument whilst sitting down, in the manner of a large string instrument such as a cello. In this case, the strap and instrument attachment means are both unnecessary and undesirable. These components can be easily separated from the instrument by unclipping the strap from the backing plate 16. To enable the user to position the instrument in a comfortable playing position, an adjustable and retractable spike 77 is included at a lower end of the instrument 100 as shown schematically in FIG. 11a. The spike is retractable to a complete or significant extent inside the instrument 100 and can be telescopically adjusted in length and locked at the desired length using a locking screw 77a that engages the spike and locks it in place using a friction force.

It will be understood by the skilled person that the balljoint and adjustment pin mechanism illustrated in the present embodiment is one example of the type of mechanism that can be used in order to adjust and lock out the positioning of and amount of friction applied to the balljoint, that to locate the orientation of the balljoint with respect to the socket and that other mechanisms may be employed without departing from the general principles disclosed herein.

Natural Language Interface

Figure 12:
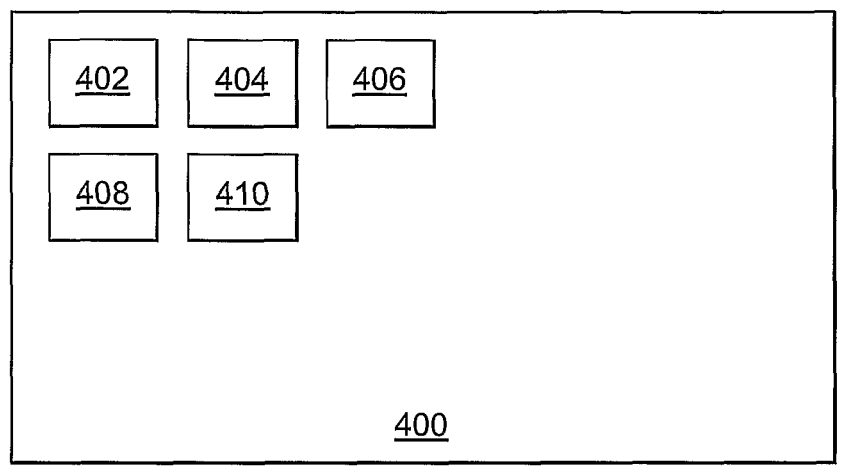
FIG. 12 is a schematic representation of a Graphical User Interface of the sound-creation interface.

Referring to FIG. 12 the graphical user interface 400 can be seen in more detail. The GUI displays sound creation components or words according to a natural language whose syntax can be further understood as follows:

The system is configured and controlled by a natural language interface, where "sentences" or "phrases" are formed in this language composed of nouns and verbs and may be formed to set data values, initiate actions, schedule future events and so on.

The sentences act as commands which can configure or program any aspect of sound or music creation such as the sound of an instrument, musical aspects such as the notes, key or mood corresponding to a set of musical keys, control of other instruments in a common performance or other aspect of the performance such as lighting.

Each sentence may be ended by either a verb or a specific sentence terminator, and the sentences may be typed in text from a computer keyboard although more preferably sentences are normally spoken by playing musical notes, which a language interpreter program decodes. Each word in the language is thus represented by a note or series of notes and can be delimited by either a louder note (a note above a certain changeable threshold) or by a specific word terminator note. The language interpreter program comprises a language "agent", one of a series of agents which can be supported by the system providing certain defined functions.

Notes used to form the words may be on any scale but the major diatonic scale (of 8 notes) is the most useful as this means that the language may be easily communicated orally (by singing or playing words to another musician) or visually (by using the traditional (doh-re-me) hand signals). It may also be communicated by means of the staff or a series of numbers. This provides both control of the sounds available to the musical instrument, control of other performance parameters such as lighting or interaction with other instruments and allocation of controls and sound outputs to the specific keys or other user inputs of the instrument.

Figure 13:
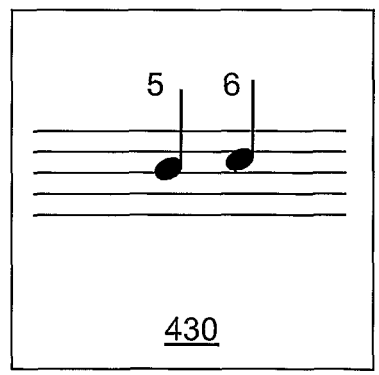
FIG. 13 is a schematic representation of an individual component or agent of the sound-creation interface.

In an illustrative embodiment shown in FIG. 12, for example, it will be seen that the sound components or words include a "set" component 402, a "scale" component 404, a "pentatonic" component 406, a "to" component 408 and a "major" component 410. Each component as shown in FIG. 13 is represented by a musical stave 430 and a natural language descriptor 432. The stave 430 can carry musical notation representing a unique set of notes, corresponding to the command and the descriptor comprises a natural language descriptor 432. For example the stave in FIG. 13 carries the crotchet/quarter notes B, C, the corresponding number 5, 6 and represents the descriptor "start". Activation of the notes or selection of the corresponding numbers allows incorporation of the "start" word into a natural language phrase which is then read by the language phrase which is then read by the language agent to start a function such as a metronome.

The components or words can be combined to form a phrase acting as a command which is then interpreted by the language agent as discussed below which will then cause one or more agents to carry out actions. A phrase like "all oscillator volume up" will cause all the oscillators that are relevant in the language agent's current context to get louder. In this case, each oscillator will be controlled by a respective additional agent which will store control values (such as volume) which values are rewritten by the phrase as interpreted and implemented by the language agent. Alternatively a separate "volume" agent may be provided to which one or more instrument agents link to provide the relevant control values.

On the other hand the phrase could refer to a specific oscillator by its descriptive information, e.g. "the sawtooth oscillator". The words can define, therefore, a musical action (such as pentatonic, major or scale) an operator action such as "to" or a command component such as "set". Upon selection and combination of the components by a user, the corresponding operation as interpreting the language agent can take place. For example where the user wishes to change the scale played by the instrument then the words can be selected and combined in the order "scale", "to", "pentatonic", "major", "set". As a result the language agent will interpret the corresponding commands to set the scale performed by the instrument to pentatonic major.

In addition, where multiple users or instruments are involved, each participant can be assigned, or assign themselves, a unique identifier in the form of a sequence of notes, which can be termed a "name". This approach can be extended to any other elements of the performance or collection of elements which may require rapid identification during a performance allowing disambiguation of participants or elements from the performance itself.

It will be seen that the manner in which the words or components are selected can be via a standard mouse over and click operation. Alternatively in a preferred approach the components can be selected by playing the notes on the stave 430 using the instrument as a selective interface. Alternatively again each note on the stave can be assigned a numerical value (as shown in FIG. 13) corresponding to a numerical value associated with the keys allowing the interface to select a component by selecting the corresponding numerical code (for example 5,6).

It can further be seen that the components 402, 404 can comprise any appropriate sound creation component such as setting pitch, tone, scale, effects, synthesizer or can relate to other performance creation components such as lighting control or indeed can allow control of other instruments or interfaces associated with the system for example other instruments performing in an ensemble as well as language agents for analyzing the descriptive data. Yet further because of the use of natural language identifiers 432 and a natural language syntax developed using the operators and commands, an easily usable interface is provided.

In one form of the syntax verbs can be recognized as phrase delimiters but numerous other possibilities exist including louder/harder key actuation.

The use of a natural language, communicated as notes sequences encoding words in a musical scale and used to configure and control a musical system and the concept of representing functions as agents which can be controlled and linked as appropriate hence allows flexibility and scaleability on an unprecedented scale.

Figure 14A:
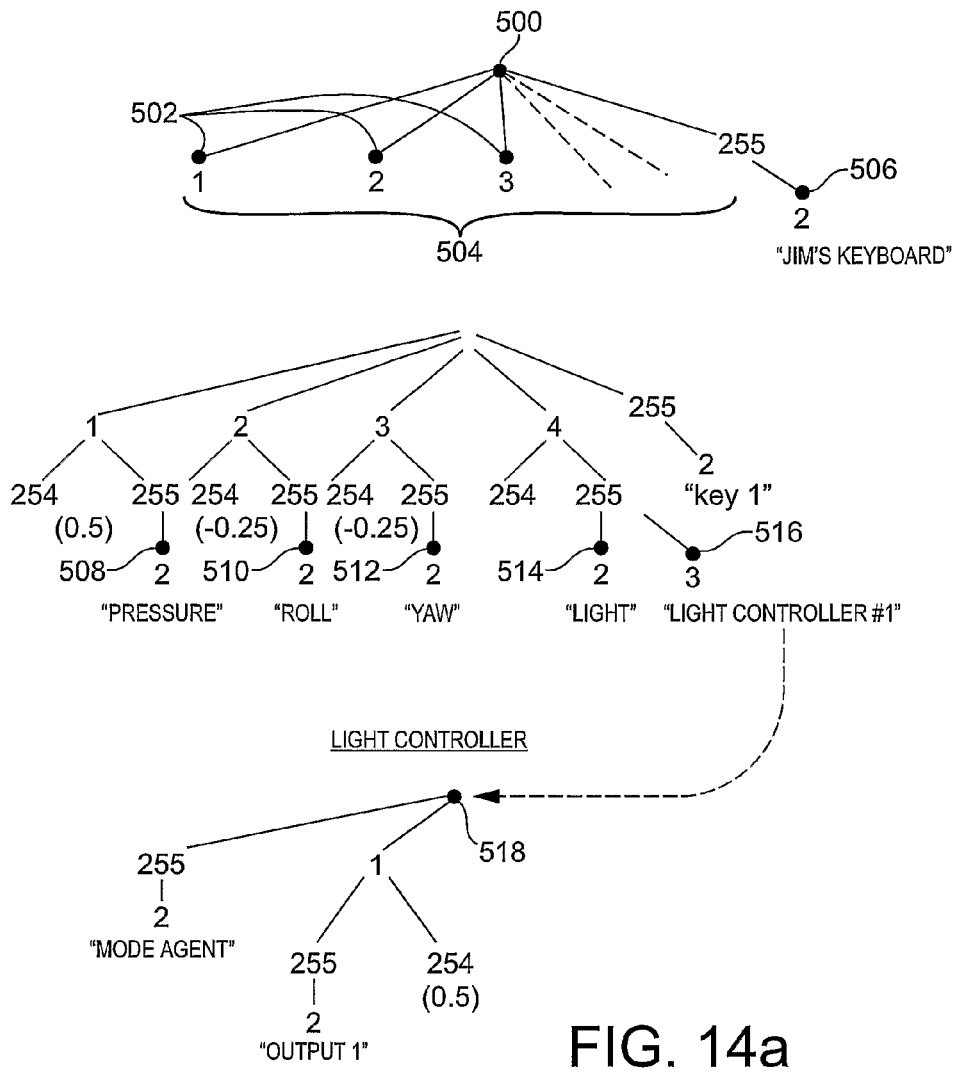
FIG. 14a is a schematic diagram showing an operational tree structure of an agent.

The manner in which the system operates can be further understood with reference to FIG. 14a. Each agent has a set of operational parameters and values represented by a tree structure which includes a root element 500, and nodes having a type value and comprising branch elements 502, each defining a key subtree 504, and leaf elements 506. Each leaf element has associated therewith a data value. For example in the case of the scale agent or component 404 shown in FIG. 12, leaf 508 may comprise the scale value (the root note of the scale A, B . . . G) the element 510 may include the mode (diatonic, chromatic, pentatonic etc) leaf element 512 may comprise as a data value the mood of the scale (minor, major) and other leaf elements can include other data values relevant to the scale.

Reverting to the natural language instruction set discussed above with reference to FIG. 12 it will be seen that a performance will principally involve involving remote procedures in the agent. However, any action which changes the setup is reflected by changes in the state tree. For example, the language agent upon implementation of the command "scale to pentatonic major set" will rewrite the values within the data structure to reflect the changed values as appropriate. For example leaf element 508 relating to the key will be unchanged whereas leaf element 510 will be set to "pentatonic" and the data value of leaf element 512 will be set to "major". As a result when the agent is applied, for example extracted by the processor for operation under control of the musical instrument, the revised scale information will be implemented and the instrument will automatically play in the major pentatonic scale of the predetermined key. As a result a simple and easily updatable data structure is provided.

The node numbered '255' is the node reserved for descriptive information, and contains inter alia the name of the node, for example in the case of a keyboard agent "Jim's keyboard".

In an embodiment, where the node 500 is named 'keyboard agent' it contains nodes 502 for each musical instrument key. These in turn are named 'key 1, key 2' etc in the same way. Each key subtree in turn carries nodes 508, 510 512 for each of the pressure, roll and yaw values which the key hardware determines. We call these more organized subtrees 504 'atoms'. In an alternative approach a key is not represented discretely in a tree but is a logical entity, the key sound being created based on the relevant agent's description of the association between a physical key and a corresponding event associated with actuation of a key or key group output from the keyboard. In particular, the keyboard has a key object containing as many logical keys as required. The language agent then associates, for example, the identification by the user of "key 1" with the appropriate logical output of the keyboard.

Each key also carries a node called 'light' 514 which is an input node. The value here is the color and intensity information for the light attached to the key. This can be set by a network message, lighting the light.

Each agent is visible over the network and can link to every other agent. A significant facility is the ability to connect atoms together. This is done by setting a certain leaf node (for example node 516) in the descriptive '255' subtree to the name of another atom. That tells the atom to synchronize with the data source over the network and use the value as its input. So for example, the "light" atom may be connected to some controller 518 and the key light will change value accordingly. Atoms may take one or multiple inputs as appropriate and similarly have multiple outputs.

More than one atom may listen to a given output, as the arrangement is a multicast model, so making a connection between atoms is akin to 'tuning' the listener into the correct source. In FIG. 14a the key light node is connected to an output from a light controller agent 518. The light could of course be connected to any appropriate action such as a pressure signal from a key, which would cause the light to change color as the user pressed the key.

Figure 14B:
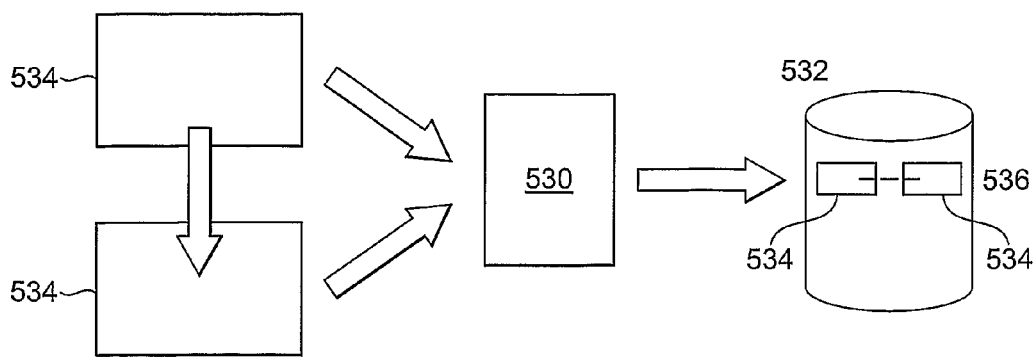
FIG. 14b shows a graphical representation of agent connections.

Some agents are capable of analyzing all the descriptive data and presenting an interface to the user as shown in FIG. 14b. The language agent 530 is one such, the GUI (designated generally 532) is another. The GUI 532 can interpret the links or connections between all the various elements and show them graphically at 536. The connection view can show all or selected agents and the corresponding connections dependent on space requirements. The "target" agent can be located at the center and highlighted by coloring or otherwise, with directly connected agents also highlighted, for example in a similar color. Arrows on the connection lines can show the direction of information flow and agents which are indirectly connected to the target agent, or unconnected, can be grouped or demoted appropriately. The language agent 530 looks at the relationships between elements and allows them to be controlled through a natural language interface.

There may of course be many more informational elements in the 255 subtree than shown. There are fields which encode relationships and which describe actions which the agent can perform. For instance, a sample player provides actions to load samples from a sample library. These are used by the language agent to allow the user to perform more sophisticated actions than simply setting a value.

Hence the system is more extensible. The language agent 530 knows how to interpret keypresses as language input, and how to find various elements of the system based on their description. The actual actions are sent to the agents 534 which know how to perform them. Simply adding another agent to the network can expand the vocabulary of the system, and add new actions which can be performed, because the language agent retrieves all that from the new agent.

The 'natural' language capability derives from the language agent's ability to see the global picture in this way. It can look at the relationships between agents and allow the user to name things by relationship. For example, if a saxophone agent (called 'sax') is connected to a mixer agent (called 'mixer 17') by virtue of its tree structure, and the mixer has a volume control, then the user can say 'sax volume to 11 set' rather than having to remember that the sax is connected to mixer 17 and saying 'mixer 17 volume to 11 set'. The data storage structure can be managed by a state manager (which can be another agent) which can store and retrieve states at any time.

Of course any number and variety of agents performing or controlling any appropriate operation or element can be provided.

A scaler agent has an input called 'scale.' The language agent sees this input, and so allows the user to say for example 'scale to pentatonic major set' which it translates into an action, in this case simply setting the scale value.

A further agent is the "talker" agent. This provides the ability to bind entire phrases or sentences to individual keys in such a manner that a command is already parsed and partially executed. This means that complex commands can be set by the musician and then executed in performance with ease and in a musically timely manner providing an unprecedented amount of control over the software environment whilst actually in performance.

To use the talker, a talker is created and a key group connected to it. The talker then provides a means to associate a language phrase with any key in that group. As is normal for key groups, there is a bidirectional connection between group and talker, the backward direction carries status information used to drive the key LEDs, lighting any keys which has phrases associated.

The talker is in itself a simple agent. It exploits the ability of the language agent (and the rest of the natural language system) to 'pre digest' language phrases and ready them for deferred execution. The talker itself merely provides the trigger by which these phrases are executed.

The advantage of the talker architecture is that if it is possible for an operation to be performed 'instantly' then that will happen. There will be no delay for the language agent to parse and analyse the phrase when the key is pressed. Indeed, the language agent may be taken entirely out of the loop.

As an example, we can construct the phrase 'piano to pentatonic major tune' which will change the tuning of the piano to the pentatonic major scale. To associate it with talker's key 1, we say instead 'piano to pentatonic major when 1 tune'. The language agent splits this up into 2 parts. It requests that the piano agent create a 'deferred execution object' corresponding to 'piano to pentatonic major tune' and also requests that the talker creates a data source which will carry an impulse when key 1 is pressed. It then connects these together. The talker causes the corresponding key to light to indicate that it carries an action.

When the key is pressed, the impulse goes straight from the talker to the piano. This may happen completely in a part of the system optimized for low latency, ensuring the latency between key press and action is as low as possible. There is no delay for the language agent to execute the sentence.

This is an instance of a more general mechanism. All verbs in the system may be used to create "deferred execution" objects. The natural language has a mechanism by which agents like the talker can advertise the ability to extend the syntax of the language. The idea is to do as much of the processing 'up front' and leave as little as possible to do at execution time. For many simple parameter changes, it's possible to reduce the amount of work that needs to be done to operations that can be carried out with little work, and thus may be performed in the part of the system optimized for low latency.

As seen in the example above, the talker provides the extension 'when key <number>' is pressed. For more complex, e.g., non key-press driven, scheduling, the talker agent may invoke a scheduler agent. The scheduler provides a similar extension describing for example musical time, allowing phrases such as: 'piano to pentatonic major at bar 16 tune' and 'piano to pentatonic minor at bar 1 tune'. Together these would tune the piano at the beginning of the song and again at bar 16. 'Drummer volume to 0 at bar 0 set' 'drummer volume every 2 bar until bar 20 up'. This would silence the drummer at the beginning of the song, and then increase the volume every 2 bars until bar 20.

The mechanism here is identical. The phrases are split into deferred object and trigger. The scheduler here provides the trigger impulses as the song clock runs. Other extensions could be written to provide triggers which will fire in almost any conceivable set of circumstances.

Figure 18:
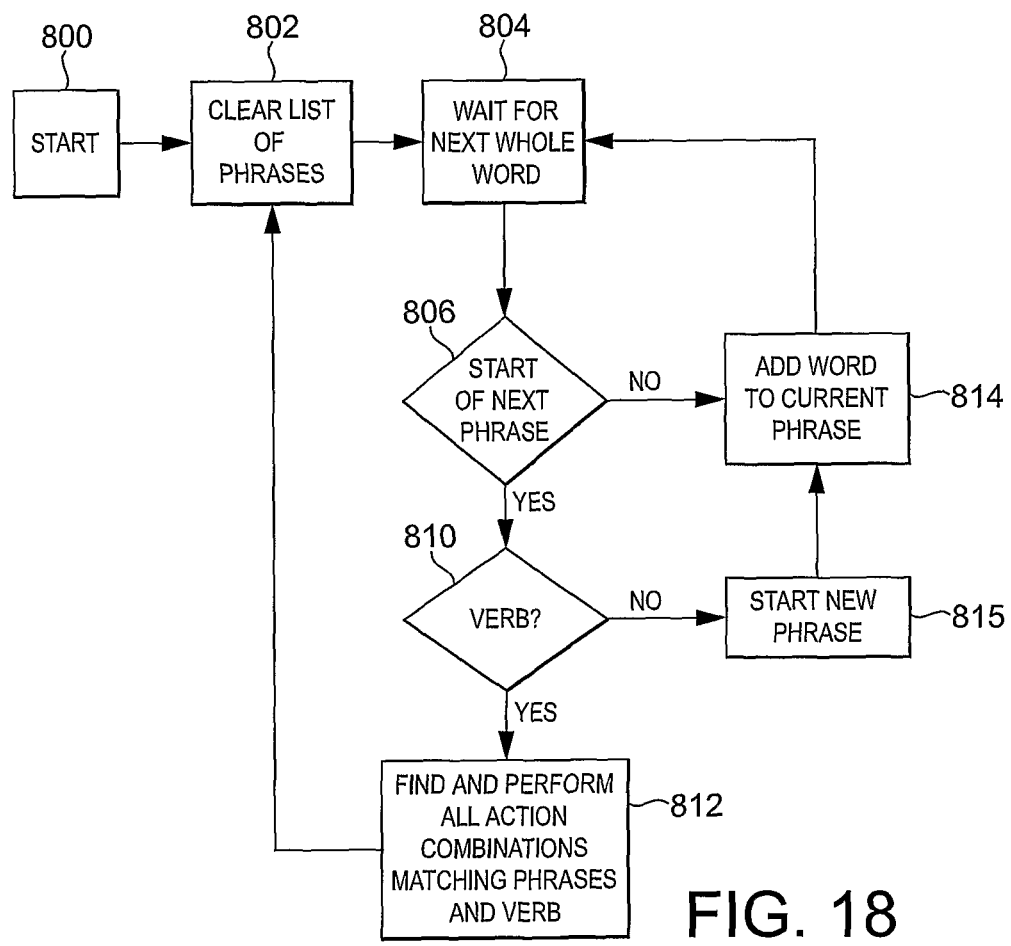
FIG. 18 is a flow diagram illustrating operation of a language agent.

The basic manner in which words can be entered, phrases determined and implemented can be further understood with reference to FIG. 18. Internal operation of the language agent can be further understood from the flow diagram shown in FIG. 18. The process starts at step 800 where a list of phrases is cleared at step 802. At step 804 the process waits for the next whole word and if at step 806 it is the start of the next phrase (for example identified by certain words such as "as, if, when") then, if at step 810 the next whole word is a verb then, at step 812, the set of action combinations that matches the phrases is found and run and the list of phrases is cleared again at step 802. The process then returns to a new phrase start at step 804.

The verb hence acts as a sentence delimiter, which may be composed of multiple phrases. Agents can expose verb descriptions in their metadata which the language agent reads. These descriptions include tests to determine which phrases are appropriate for each action. As discussed above in relation to the talker agent, verbs can be invoked directly, or can be used to create deferred action objects for later invocation. These deferred actions are connected to trigger objects and the action takes place each time the trigger activates. Some agents thus expose descriptions of "trigger objects" that they can create. For example the talker agent described above creates trigger objects which trigger on a simple key press, and the scheduler agent creates trigger objects that go off at described times for example at certain points defined in a musical performance. Both trigger and deferred action are normal atoms in the state and the connection between them is a normal atom-atom connection.

Referring once again to FIG. 18, at step 806 if the word is not the start of a phrase then the word is added to the current phrase at step 814. If the word is not a verb at step 810 then a new phrase is started at step 815 and the process returns to step 804.

Figure 19:
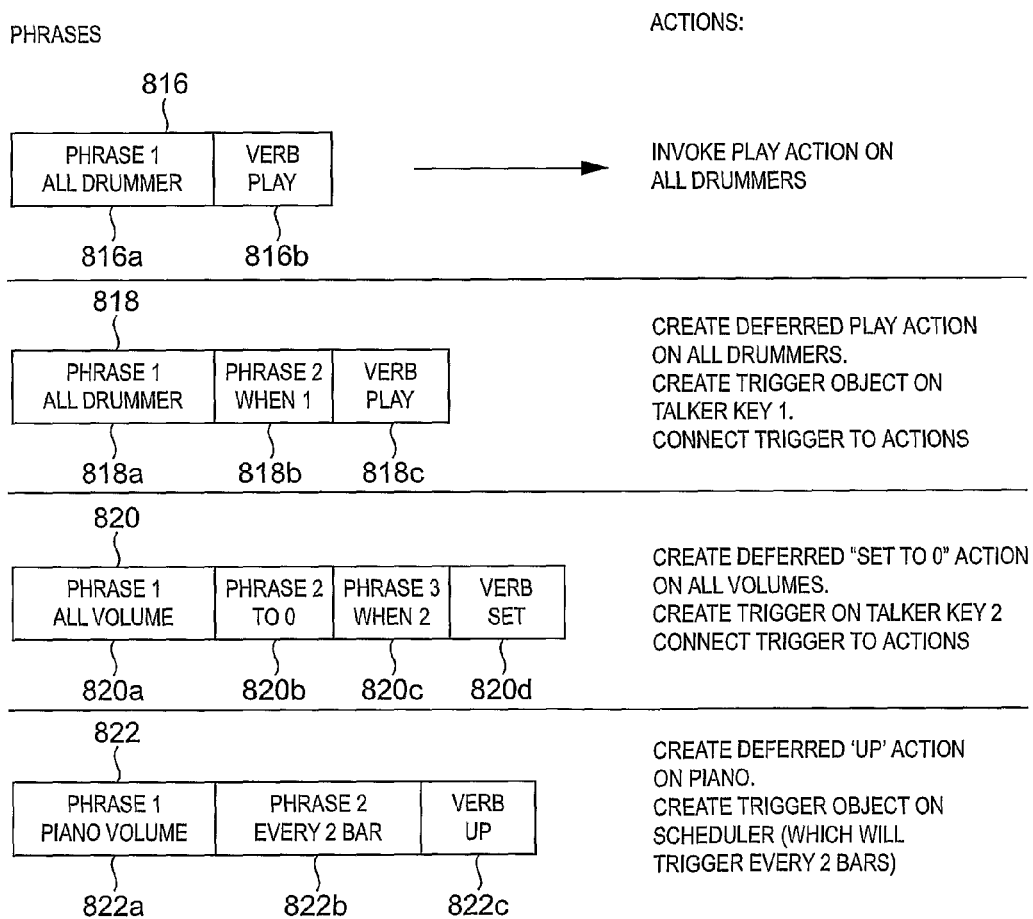
FIG. 19 shows phrases including deferred execution objects.

Referring to FIG. 19 phrases including both immediate and deferred execution objects are shown. For example phrase 816 includes words "all drummer" 816*a* and a delimiting verb "play" 816*b* which, when programmed by inputting the correct key sequence, will invoke a play action on all drummers. Phrase 818 again includes the words "all drummer" 818*a*, deferred execution object "when 1" 818*b* and the delimiter verb "play" 818*c* which creates a deferred play action on all drummers creating a trigger object on talker key 1. Accordingly when the key corresponding to key 1 as defined on the talker is actuated this triggers the all drummer play action. Referring to phrase 820 the words "all volume" 820*a* "to zero" 820*b*, "when to" 820*c* and "set" 820*d* creates a deferred "set to zero" action on all volumes when triggered by talker key 2. Phrase 822 specifies a more complex arrangement for example also using a scheduler agent including "piano volume" 822*a*, "every two bar" 822*b* and "up" 822*c* which creates a deferred "volume up" action on the piano when triggered by a trigger object created on the scheduler which will trigger every two bars.

In order to rapidly detect changes within components or agents allowing real time operation the nodes of the data structure including root, branch and leaf elements can further be assigned with two check values, one which is associated with the data value for the dode itself—for example a hash of the ASCII or hexadecimal values associated with the data value and the other built from the identity and hash values of any children. The leaves have a null value dependent on the hash function indicating no children.

Accordingly internal state is represented in a form which can be easily propagated between agents and any change in the data value will result in a change in the hash value and the server (e.g., data storage) routinely transmits both check values for comparison by the client (e.g., a participant GUI) with stored values, allowing a rapid check that the values are up-to-date. So, for example, where the mode data value associated with leaf element 508 and the mood data value associated with leaf element 510 are changed but the key data value associated with element 506 is not changed, then the hash values associated with leaf values 508 and 510 will change but not that associated with 506. Each branch element has a hash value associated with the hash values of the leaf or branch elements depending therefrom meaning that the hash values associated with branch elements 504 and 502 will also change. Similarly the hash value at the root element is a function of the hash values of each or branch element depending therefrom as a result of which the hash value of the root element 500 will also change.

Accordingly any changes in the agent can quickly be detected by the processor by comparing the current hash value of the root element of the stored previous hash value. If this has changed then this means that there has been a change in the agent and the processor can traverse down through the tree assessing the hash value associated with each depending leaf or branch value until it reaches a leaf whose hash value has changed. In particular, if the root data check is wrong, the client has to retrieve the root node data.

If the root tree check is wrong, this means that something has changed deeper in the tree. The client then requests the data and tree checks for all the direct children of the root node. By comparing these with stored values, the client can see which paths down the tree are wrong. It then applies this same process recursively to each of the children that have the incorrect checks. Thus the client can retrieve only the parts of the tree that have changed, avoiding the need to search through the whole tree.

As a result the processor can quickly update implementation of the agent in real time such that all changes are quickly and efficiently detected and implemented and the state of an agent can be simply and quickly read from a remote location allowing synchronization with it. The process relies on interaction between the data storage/server and the observer or client to compare live and stored values. It will be noted that a server may serve multiple clients, for example multiple participants to a performance but is stateless with respect to the clients such that it is not necessary to maintain individual records per client.

Figure 15:
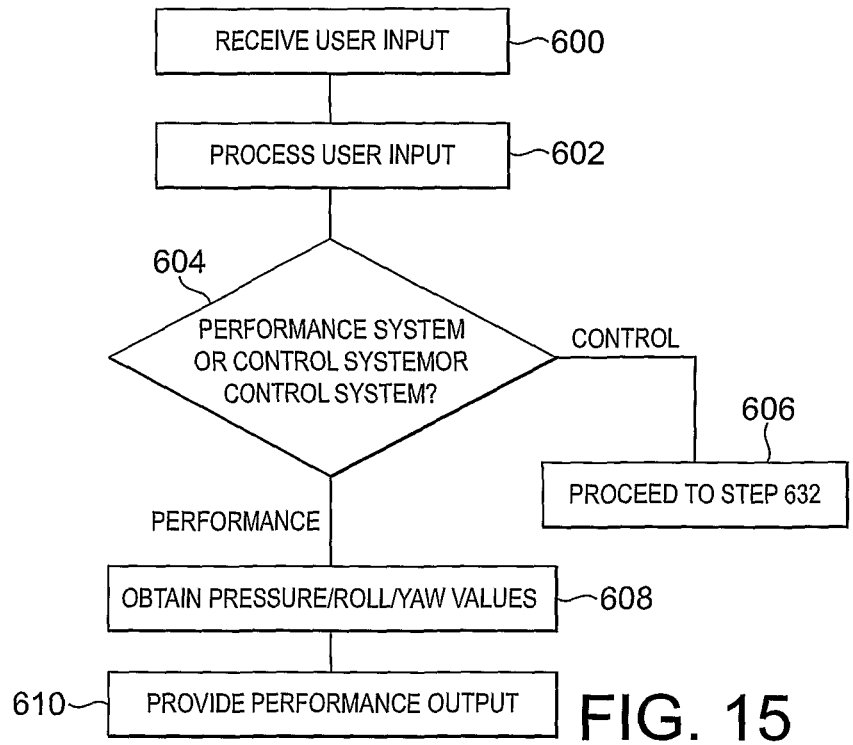
FIG. 15 is an embodiment of a flow diagram of use of the sound-creation interface.
Figure 16:
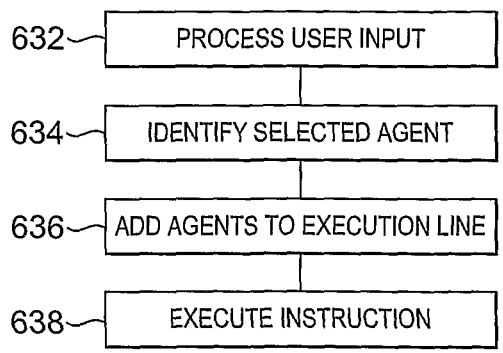
FIG. 16 is an embodiment of a control mode of operation of the sound-creation interface.

The manner in which the interface can be used for both performance and command systems can be further understood with reference to FIG. 15. At step 600 a user input is received for example by depression of a key on the instrument. At step 602 the input is processed at the mechanical-electronic interface. At step 604 it is processed by the system where performance and control or command are separate systems as discussed in more detail below. In the case of the performance system, at step 608 the system determines the key pressure and also any roll or yaw values in the manner discussed above. This value is then provided to the processor via the electronics processor interface and the processor then performs the operation corresponding to these values.

For example the key selected may determine the note played, the pressure may determine the volume, the roll value may determine the vibrato and the yaw value may determine any bending or change in the pitch of the note. The key pressure may be interpreted according to whatever criteria has been set up such that it may change the voice of the instrument, control another instrument, control other performance affects such as lighting and so forth, governed only by the processing capability of the processor and the parameters set by the performer or user.

In one aspect the tuning is derived from the key by a specialized 'tuning agent' called the scaler. There is a processing pipeline made from a number of agents connected together. Keys are connected to Key Groups which build a customized group of keys (which can even be a keyboard), and take a number of keys and aggregate their signals together. An individual key has pressure, roll and yaw outputs, and a key group has single pressure, roll, and yaw outputs which contain the corresponding key signals grouped together. This is an important property of the system, allowing multiple values to be carried together under one name. It also presents a 'key number' output which encodes the key position in the group.

The output of a key group includes a control stream which encodes the scale and pitch information, which is implemented by the scaler, allowing different key groups attached to the same sound generator to have their own melodic behavior. The aggregated information is then fed to a scaler agent, and the scaler generates frequency information based upon which key is pressed. It has a 'pitch bend' input, which, if connected to a suitable output like the roll or yaw output from a key, will cause the frequency to be modified. The input could be connected to anything else in the system. If there was a footswitch agent which presented the pressure on a switch as an output, that could readily be used to modify the frequency generated by a key.

The control system and performance systems are entirely separate, and run concurrently. They are separate programs which may even be running on different computers. A mode key is connected to an agent which simply adjusts the routing from the keyboard to all the various agents (instruments, language, etc) which are connected to it. When the user selects the sax, the signals to all the users of the keyboard except the sax are temporarily disabled. Likewise, when language is enabled, the key signals to everything except the language agent are suppressed. The key signals are routed through software switches which are controlled by the mode key.

At the control or command system, at step 632 subsequent user inputs such as sequential key presses are processed to identify specific keys pressed and correlate these with the agents displayed on the GUI. For example where the agent is identifiable and selectable by a predetermined numerical code or note sequence corresponding to keys on the instrument or interface, then keying the relevant code will transfer the selected agents for execution. Once all of the required agents have been selected for example by identifying the desired natural language command and loading the corresponding agent into a control process representable for example as an execution line at step 634, 636, the natural language instruction can be executed for example by pressing the control key once again at step 638. For example the instructions may have been as set out in the example above, a change to another key. The performance system then allows generation of a sound output 610 according to the executed instruction.

It will be seen that a simple yet highly flexible sound creation interface is provided according to the steps set out above allowing both an enhanced dynamic and interactive musical performance together with rapid real-time programming of the system to vary all aspects of the performance. Creation and manipulation of sound creation components such as agents is facilitated through the use of a GUI programmable by the instrument itself, and a manager is provided ensuring that the invoked agents are executed in real time allowing all aspects of the performance to be controlled and manipulated at all times.

The interface itself can have any number of keys and any function can be attributed to any key allowing it for example to by played using fingering styles from known instruments or entirely new fingering styles from, but also allowing far more complex musical concepts to be expressed for example by attributing sequences of notes, cords or other effects to any key as well as more general control commands allowing control of other aspects of the performance such as mastering control other instruments connected to the system or other performance aspect such as lighting, sound and so forth. The key structure on the interface can be of any complexity and can even include a single key with multiple degrees of freedom, or other user interface elements such as breath pipes, strings, valves, pedals and so forth. The sound creation interface can take the form of the mechanical interface with built in processor and, as required, GUI, the combination of mechanical interface with an external processor and GUI or indeed can take the form of the processor or optionally GUI itself with any appropriate user input.

The skilled person will note that the various embodiments described herein are combinable where appropriate and that they are intended as a non-limiting disclosure.

The invention claimed is:

1. A user input element comprising a sensor in operable connection therewith for detecting movement in three axes of a user input element, the sensor comprising a light emitter, a light detector and a shutter component arranged to be in operable connection with the user input element and to be moveable therewith in response to user actuation of the user input element to at least partially occlude a light path between the light emitter and light detector, whereby a level of light detected at the light detector corresponds to a user actuation of the user input element;
   a resilient biasing element upon which the shutter component is supported for movement thereof in response to user actuation of the user input element; and
   a housing in which the sensor is housed, and a sealing element disposed in the housing between the user input element and the sensor for prevention of ingress of any of light, liquid or solid matter therein.

2. A user input element as claimed in claim 1 in which the sealing element comprises a rubber gasket.

3. A user input element as claimed in claim 2 in which the rubber gasket is manufactured from carbon loaded silicone rubber.

4. A user input element comprising:
   a sensor in operable connection therewith for detecting movement in three axes of a user input element, the sensor comprising a light emitter, a light detector and a shutter component arranged to be in operable connection with the user input element and to be moveable therewith in response to user actuation of the user input element to at least partially occlude a light path between the light emitter and light detector, whereby a level of light detected at the light detector corresponds to a user actuation of the user input element;
   a resilient biasing element upon which the shutter component is supported for movement thereof in response to user actuation of the user input element;
   a prismatic element arranged to receive light emitted from the light emitter and to focus the light on the light detector; in which the prismatic element comprises a first prism element arranged to receive light from the light emitter and to direct the light towards a second prism element, the second prism element being arranged between the first prism element and the light detector for receiving light passing through the first prism element and directing the light onto the light detector; in which there is provided a plurality of light emitters arranged around the light detector, and a plurality of first prism elements corresponding to the plurality of light emitters, each of the plurality of first prism elements being arranged to receive light emitted from a corresponding one of the plurality of light emitters and to direct the light towards the second prism element; and in which the plurality of light emitters and the light detector are disposed on a printed circuit board for electronic communication with a processor;
   four light emitters arranged around a central light detector and wherein the prismatic element comprises four first prisms, each of the first prism elements corresponding to a respective one of the four light emitters and being arranged around a central one of the second prim elements.

5. A sound creation interface comprising:
   a user input element comprising a sensor in operable connection therewith for detecting movement in three axes of a user input element, the sensor comprising a light emitter, a light detector and a shutter component arranged to be in operable connection with the user input element and to be moveable therewith in response to user actuation of the user input element to at least partially occlude a light path between the light emitter and light detector, whereby a level of light detected at the light detector corresponds to a user actuation of the user input element;
   a spring upon which the shutter component is supported for movement thereof in response to user actuation of the user input element;
   a prismatic element arranged to receive light emitted from the light emitter and to focus the light on the light detector; in which the prismatic element comprises a first prism element arranged to receive light from the light emitter and to direct the light towards a second prism element, the second prism element being arranged between the first prism element and the light detector for receiving light passing through the first prism element and directing the light onto the light detector; in which there is provided a plurality of light emitters arranged around the light detector, and a plurality of first prism elements corresponding to the plurality of light emitters, each of the plurality of first prism elements being arranged to receive light emitted from a corresponding one of the plurality of light emitters and to direct the light towards the second prism element; and in which the plurality of light emitters and the light detector are disposed on a printed circuit board for electronic communication with a processor; and wherein:
   a plurality of user input elements arranged in an array on the printed circuit board; and
   a base housing upon which the printed circuit board is disposed, and a rigid curved frontage comprising a laminate structure disposed over the plurality of user input elements so as to allow user actuation of the plurality of user input elements.

6. A sound creation interface as claimed in claim 5 in which the laminate structure includes an aperture through which each user input element is arranged to protrude for user actuation thereof.

7. A sound-creation interface as claimed in claim 5 further comprising at least one of user input elements being in electrical communication with the processor for detection of unintentional external actuation thereof.

* * * * *